(12) United States Patent
Shikii et al.

(10) Patent No.: US 6,313,938 B1
(45) Date of Patent: Nov. 6, 2001

(54) PLANAR LIGHTWAVE CIRCUIT MODULE AND OPTICAL FIBER AMPLIFYING DEVICE

(75) Inventors: Shigeru Shikii; Akira Sasaki, both of Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 0 days.

(21) Appl. No.: 09/437,224

(22) Filed: Nov. 10, 1999

(30) Foreign Application Priority Data

Jan. 12, 1999 (JP) .................................................. 11-005214

(51) Int. Cl.[7] ...................................................... H01S 3/00
(52) U.S. Cl. ................................................................. 359/333
(58) Field of Search ................................. 359/333, 341; 385/14, 129, 130, 131, 39

(56) References Cited

U.S. PATENT DOCUMENTS

| | | | |
|---|---|---|---|
| 4,904,036 | * 2/1990 | Blonder | 350/96.11 |
| 5,383,051 | * 1/1995 | Delrosso et al. | 359/341 |
| 5,452,124 | * 9/1995 | Baker | 359/341 |
| 5,555,127 | * 9/1996 | Abdelkader et al. | 359/341 |
| 5,579,154 | * 11/1996 | Mueller-Fiedler | 359/341 |
| 5,778,132 | * 7/1998 | Csipkes | 385/135 |
| 5,812,290 | * 9/1998 | Maeno et al. | 359/117 |
| 5,812,307 | * 9/1998 | Naganuma | 359/341 |

FOREIGN PATENT DOCUMENTS

| | | | |
|---|---|---|---|
| 07240713 A | 9/1995 | (JP) . | |
| 408086931A | * 4/1996 | (JP) | G02B/6/293 |
| 408248275A | * 9/1996 | (JP) | G02B/6/42 |
| 408327847A | * 12/1996 | (JP) | G02B/6/24 |

OTHER PUBLICATIONS

Hideki Ishio; "Optical Fiber Amplifers and Their Use" Chapter 5: Erbium–doped Fiber Amplifier (EDFA); Ohm Publishing House; pp. 110–111.

Takeshi Kitagawa; Rare–Earth–Doped Planar Waveguide Amplifiers; Proc. Of Topical Meeting Optical Amplifiers and Their Applications; MC1; 1993; pp. 136–139.

Optronics–sha; "Hikari tsuushingijyutsu no saishin shiryo shu III"; pp. 122–127.

Optronics–sha; "Hikari device seimitsukako handbook"; pp. 273–279.

\* cited by examiner

*Primary Examiner*—Thomas H. Tarcza
*Assistant Examiner*—Deandra M. Hughes
(74) *Attorney, Agent, or Firm*—Venable; Robert J. Frank; James R. Burdett

(57) ABSTRACT

Provided is a planar lightwave circuit module in which the required optical components constituting an optical fiber amplifier and representing components other than amplifying optical fibers are formed into a unitary structure on a common substrate. This planar lightwave circuit module comprises signal light input ports, signal light output ports, and first and second connection ports. The first connection port is connected to the signal light output ports and to one end of an amplifying optical fiber. The second connection port is connected to the signal light input ports and to the other end of the amplifying optical fiber. Optical coupling means for feeding pumping light from an pumping source to the amplifying optical fiber are also provided in the form of waveguides or in integrated form. Amplifying optical fibers are connected from the outside to the first and second connection ports of this planar lightwave circuit module, yielding an optical fiber amplifier.

47 Claims, 23 Drawing Sheets

PLANAR LIGHTWAVE CIRCUIT MODULE AND OPTICAL FIBER AMPLIFYING DEVICE

BACKGROUND OF THE INVENTION

1. Field of the Invention

The present invention relates to a planar lightwave circuit module for an optical fiber amplifying device suitable for use in optical fiber communications, and to the aforementioned optical fiber amplifying device.

2. Description of Related Art

An optical fiber amplifier is described in "Optical Fiber Amplifiers and Their Use" (Chapter 5: Erbium-doped Fiber Amplifier (EDFA); by Hideki Ishio, Ohm Publishing House, pp. 110–111) (Reference 1).

The structure of this conventional optical fiber amplifier (or amplifying device) is shown in FIG. 1. A brief description of the conventional optical fiber amplifying device will be given with reference to FIG. 1.

In FIG. 1, part of a signal light input is separated by an optical coupler 131 and provided to a photodetector (hereinafter abbreviated as "PD") 132. The remaining signal light is provided to a wavelength division multiplexer (hereinafter abbreviated as "WDM") 134.

In WDM 134, multiplexing is performed between signal light provided by the optical coupler 131 and forward pumping light provided by a laser diode (hereinafter abbreviated as "LD") 135 serving as an a pumping source, and the resultant multiplexed signal is provided to an amplifying optical fiber 136 through an optical isolator 133. In WDM 137, backward pumping light provided by LD 138 is multiplexed with signal light and the resultant multiplexed signal is provided to the amplifying optical fiber 136.

The amplifying optical fiber 136 is provided with the signal light and forward pumping light from WDM 134 through the optical isolator 133 and with the backward pumping light from WDM 137, and the signal light is amplified. Pumping light is removed from the amplified signal light by WDM 137, and the resultant amplified signal light is provided to an optical coupler 140 through an optical isolator 139.

Most of the signal light provided to the optical coupler 140 is outputted to an output terminal, and the remaining signal light is provided to PD 142. Part of the reflected light input from the output terminal is separated by the optical coupler 140 and provided to PD 141.

As noted above, various optical components (for example, optical couplers, WDM, optical isolators, PD, and LD) are used for conventional optical fiber amplifying devices, and optical fibers (hereinafter referred to as "pigtails") are generally used to transmit light to and from the input/output units of such optical components.

With conventional optical fiber amplifying devices, however, pigtails are used for the input/output units of the optical components constituting these devices, and connections among the components are formed using these pigtails, thereby creating a need to accommodate such optical components, connections among them, and pigtail fibers. This arrangement is disadvantageous in that it yields a bulky device. Another drawback is the need to perform work involved in the mounting of the optical components, connections among them, and pigtail fibers, thereby increasing the number of manufacturing steps.

An alternative to using such pigtails is to directly connect the exit surface of an optical component and the incident surface of another optical component, and to use a composite optical component obtained by the partial or complete integration of these components. Using such composite optical components is preferred as a way of overcoming the aforementioned shortcomings.

Because of the absence of light-transmitting pigtails in such composite optical components, however, a plurality of optical components must be fixed at appropriate positions in relation to a single optical collimator (parallel beam) system. Specifically, the optical axes of optical components must be aligned with each other. As a result, fine adjustment or the use of high-precision components is required, making this approach disadvantageous because of an increase in the number of manufacturing steps and a higher cost.

Furthermore, constructing erbium-doped fibers (light-amplifying fibers) in the form of optical waveguides was studied by T. Kitagawa ("Rare-earth Doped Planar Waveguide Amplifiers," *Proc. of Topical Meeting Optical Amplifiers and Their Applications*, MC1, pp. 136–139 (1993) (Reference 2)). This construction is suitable for miniaturization. This construction is still disadvantageous, however, in that a phenomenon called concentration extinction occurs because of increased erbium density, and optical amplification characteristics are adversely affected by this phenomenon.

Another feature of optical fiber amplifying devices is that a large number of optical components other than light amplification fibers are mounted in a narrow space. Configuring these optical components as planar lightwave circuit modules would make them interchangeable independent of the type of optical fiber amplifying device.

SUMMARY OF THE INVENTION

Consequently, an object of the present invention is to provide a planar lightwave circuit module in which the desired optical components of the optical fiber amplifier are integrated together.

Another object of the present invention is to provide an optical fiber amplifying device constructed using the aforementioned planar lightwave circuit module.

Aimed at attaining the stated objects, the planar lightwave circuit module of the present invention comprises signal light input ports, signal light output ports, a first connection port connected to the signal light input ports and to one end of an amplifying optical fiber, a second connection port connected to the signal light output ports and to the other end of the amplifying optical fiber, and optical coupling means for feeding pumping light from a pumping source (or an excitation light source) to the amplifying optical fiber.

In addition, the planar lightwave circuit module of the present invention should preferably comprise a third connection port connected to the pumping source, and a fourth connection port connected to a monitoring element for monitoring the operating state of the amplifying optical fiber.

Furthermore, in the preferred embodiment of the planar lightwave circuit module of the present invention, the ports should be spaced at regular intervals and it is sometimes possible to adopt a structure in which dummy ports are provided to the aforementioned module, and the ports are spaced at regular intervals.

The optical fiber amplifying device of the present invention may also be configured such that an amplifying optical fiber is connected to the aforementioned planar lightwave circuit module.

Of the optical components constituting an optical fiber amplifying device based on the planar lightwave circuit module described above, required optical components other than the amplifying optical fiber are configured as a single module. To achieve such modularization, light propagation paths are substantially configured as optical waveguides. Consequently, optical components that can be configured as waveguides are incorporated as such waveguides into a single substrate. Optical components that cannot be configured as waveguides are formed by integration at and/or mounted on the substrate. Optical couplers and WDMs can be configured as waveguides. Optical isolators, monitoring photodetectors (PD), and pumping sources (LD) cannot be configured as waveguides and are thus formed by integration at and/or mounted on a substrate provided with waveguides. When they are in the form of multilayer dielectric films, WDMs cannot be configured as waveguides and are therefore integrated at and/or mounted on the substrate.

According to the above-described planar lightwave circuit module of the present invention, all the optical components or only the required portion thereof can be incorporated into a common substrate.

According to the planar lightwave circuit module of the present invention, incorporation of the required optical components of an optical fiber amplifying device into a single substrate allows the required connections between the incorporated optical components and the units outside this module to be made with the aid of the input ports, output ports, and connection ports provided to this module. Consequently, the required connections of an optical fiber amplifying device can be made with the aid of a single planar lightwave circuit module.

Another feature of the planar lightwave circuit module of the present invention is that because optical components other than the amplifying optical fiber are incorporated into a single substrate, this module has no dependence on the characteristics of the optical fiber, that is, the amplification medium. This module can therefore be used equally successfully with an optical fiber having any characteristics.

Furthermore, an optical fiber amplifying device can be formed by a simple operation in which an amplifying optical fiber having the desired amplification characteristics is merely connected to the planar lightwave circuit module of the present invention.

Yet another feature of the optical fiber amplifying device of the present invention is that because it can be formed by connecting an amplifying optical fiber to the planar lightwave circuit module, the device is miniaturized, the steps involved in manufacturing the device are simplified, and the optical amplification characteristics are not affected in any way.

BRIEF DESCRIPTION OF THE DRAWINGS

The foregoing and other objects, features and advantages of the present invention will be better understood from the following description taken in connection with accompanying drawings, in which.

DESCRIPTION OF THE PREFERRED EMBODIMENTS

(A) First Embodiment

A first embodiment, which is obtained using the waveguide device for optical fiber amplifying devices and an optical fiber amplifying device that pertain to the present invention, will now be described in detail with reference to the drawings.

(A-1) Description of the Structure

Figure 1:
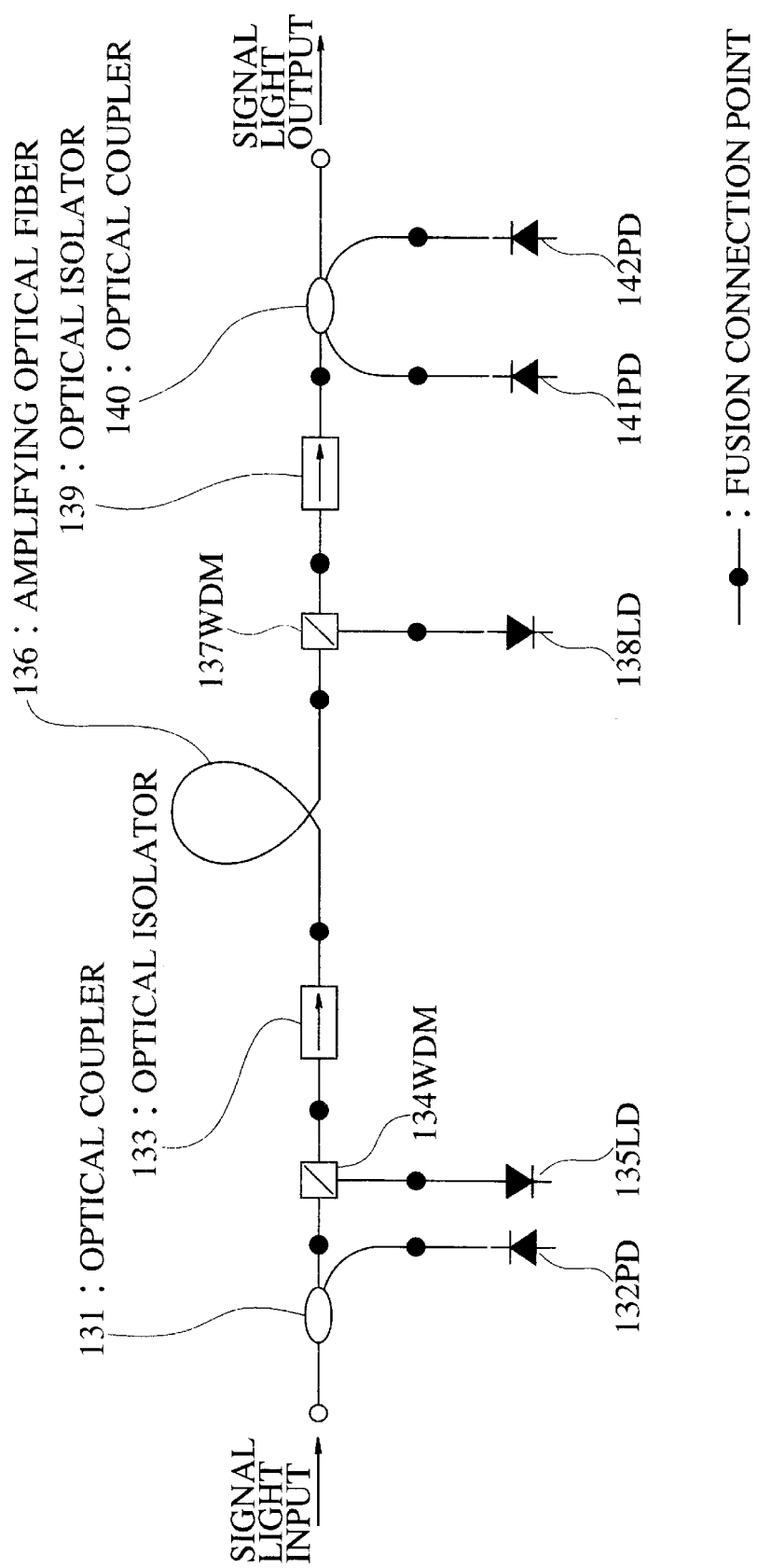
FIG. 1 is a block diagram depicting the structure of a conventional optical fiber amplifying device.
Figure 3:
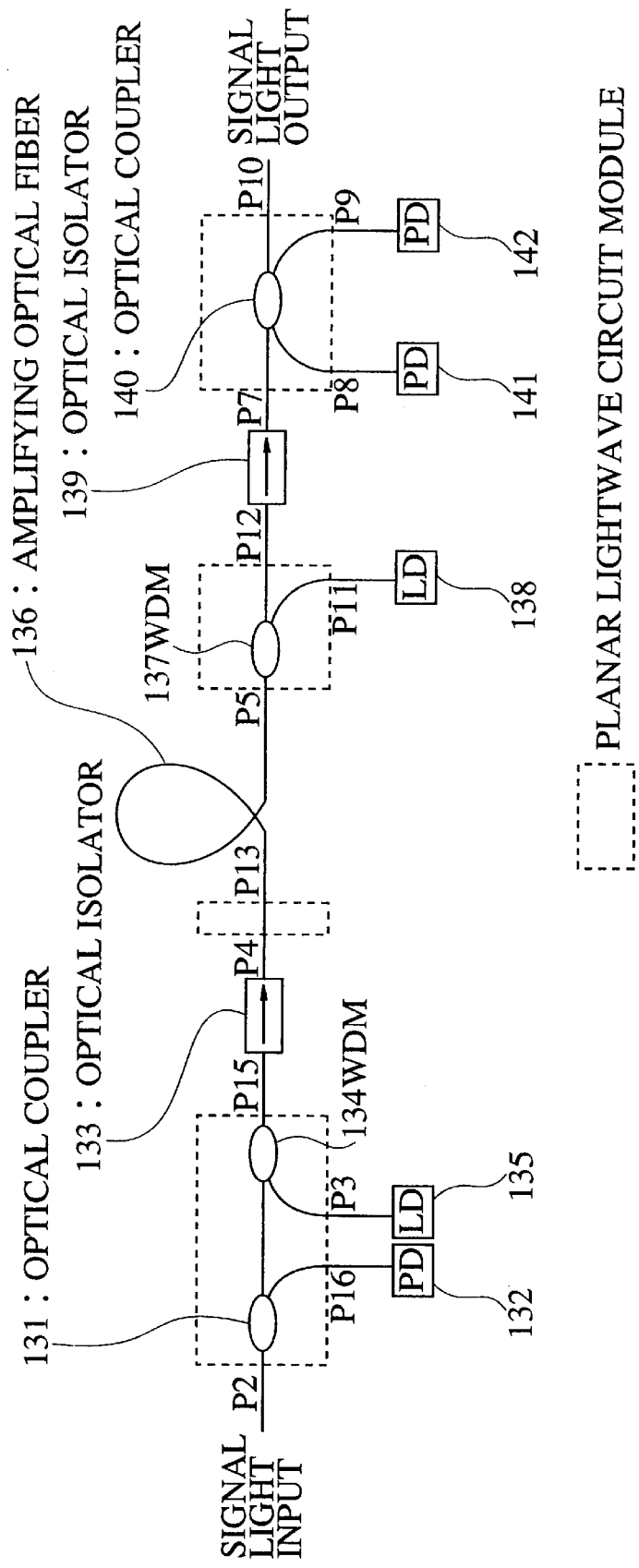
FIG. 3 is a block diagram depicting the structure of the optical fiber amplifying device according to a first embodiment.

FIG. 3 is a block diagram depicting the structure of the optical fiber amplifying device according to the first embodiment. In FIG. 3, the same symbols are used to designate structural components that correspond to the conventional structure shown in FIG. 1.

In FIG. 3, the optical fiber amplifying device of the first embodiment comprises optical couplers 131 and 140, an input power monitoring PD 132, optical isolators 133 and 139, WDMs 134 and 137, a forward pumping LD 135, an amplifying fiber 136, a backward pumping LD 138, a reflected light monitoring PD 141, and an output monitoring PD 142.

The optical fiber amplifying device of the first embodiment is similar to the above-described conventional optical fiber amplifying device in terms of the manner in which the connections among the structural elements are related to each other.

In the optical fiber amplifying device of the first embodiment, however, the optical components (that is, the optical couplers 131 and 140, and the WDMs 134 and 137) are in the form of optical waveguides. These optical couplers 131 and 140, and WDMs 134 and 137 are configured as a unitary structure in and/or on a substrate. As described herein, a product obtained by configuring optical components as optical waveguides at a common substrate will be referred to as a planar lightwave circuit module. In FIG. 3, structural components corresponding to this planar lightwave circuit module are circled by a broken line. Following is a detailed description of this planar lightwave circuit module. This planar lightwave circuit module will also be referred to as an optical waveguide substrate or an optical waveguide device.

Figure 2:
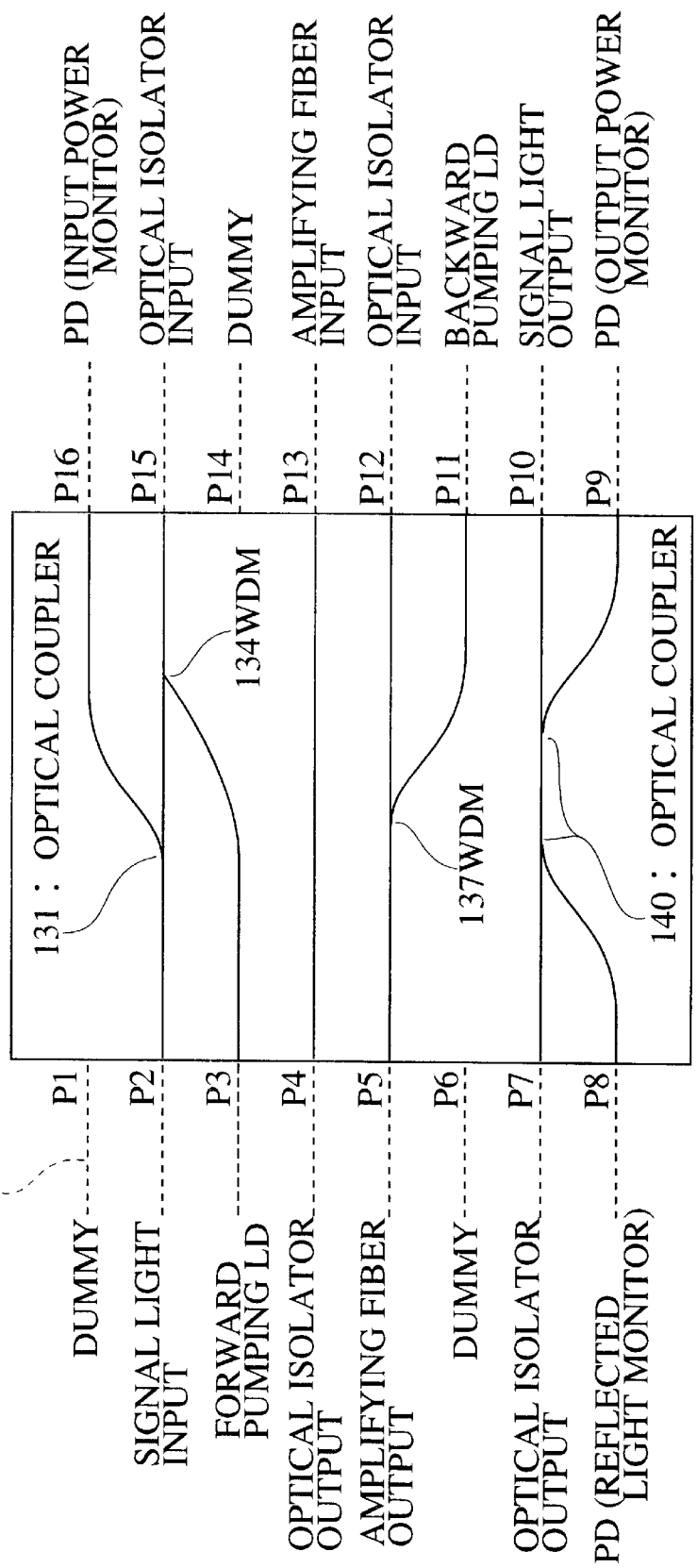
FIG. 2 is a diagram depicting a detailed structure of the optical waveguide device according to a first embodiment.

FIG. 2 is a diagram depicting a detailed structure of the planar lightwave circuit module according to the first embodiment. In FIG. 2, structural components corresponding to the block diagram shown in FIG. 3 are designated using the same symbols. In this example, the planar lightwave circuit module has a rectangular shape.

In FIG. 2, the planar lightwave circuit module of the first embodiment comprises optical couplers 131 and 140 for the monitoring of input/output light, and WDMs 134 and 137 for the multiplexing of signal light and pumping light. The planar lightwave circuit module further comprises 16 ports P1–P16 for forming connections with optical fibers.

The following symbols are used to designate the manner in which the connections among the ports are related to each other.

P1: dummy optical fiber
P2: signal light input
P3: forward pumping LD (Laser Diode)
P4: first optical isolator output
P5: amplifying optical fiber output (For example, optical fiber doped with a rare-earth metal, such as erbium-doped optical fiber (EDF), praseodymium-doped optical fiber (PDF), or neodymium-doped optical fiber. A common single-mode optical fiber is sometimes connected when a nonlinear effect such as stimulated Raman scattering or stimulated Brillouin scattering is used.)
P6: dummy optical fiber
P7: second optical isolator output
P8: reflected light monitoring PD (Photo Detector)
P9: output power monitoring PD
P10: signal light output
P11: backward pumping LD
P12: second optical isolator input
P13: amplifying optical fiber input
P14: dummy optical fiber
P15: first optical isolator input
P16: input power monitoring PD In the first embodiment, all the ports P1–P8 on the left-side end face of the planar lightwave circuit module shown in FIG. 2 are input ports, and all the ports P9–P16 on the right-side end face are output ports. These ports P1–P8 and P9–P16 are spaced at regular intervals.

Figure 4:
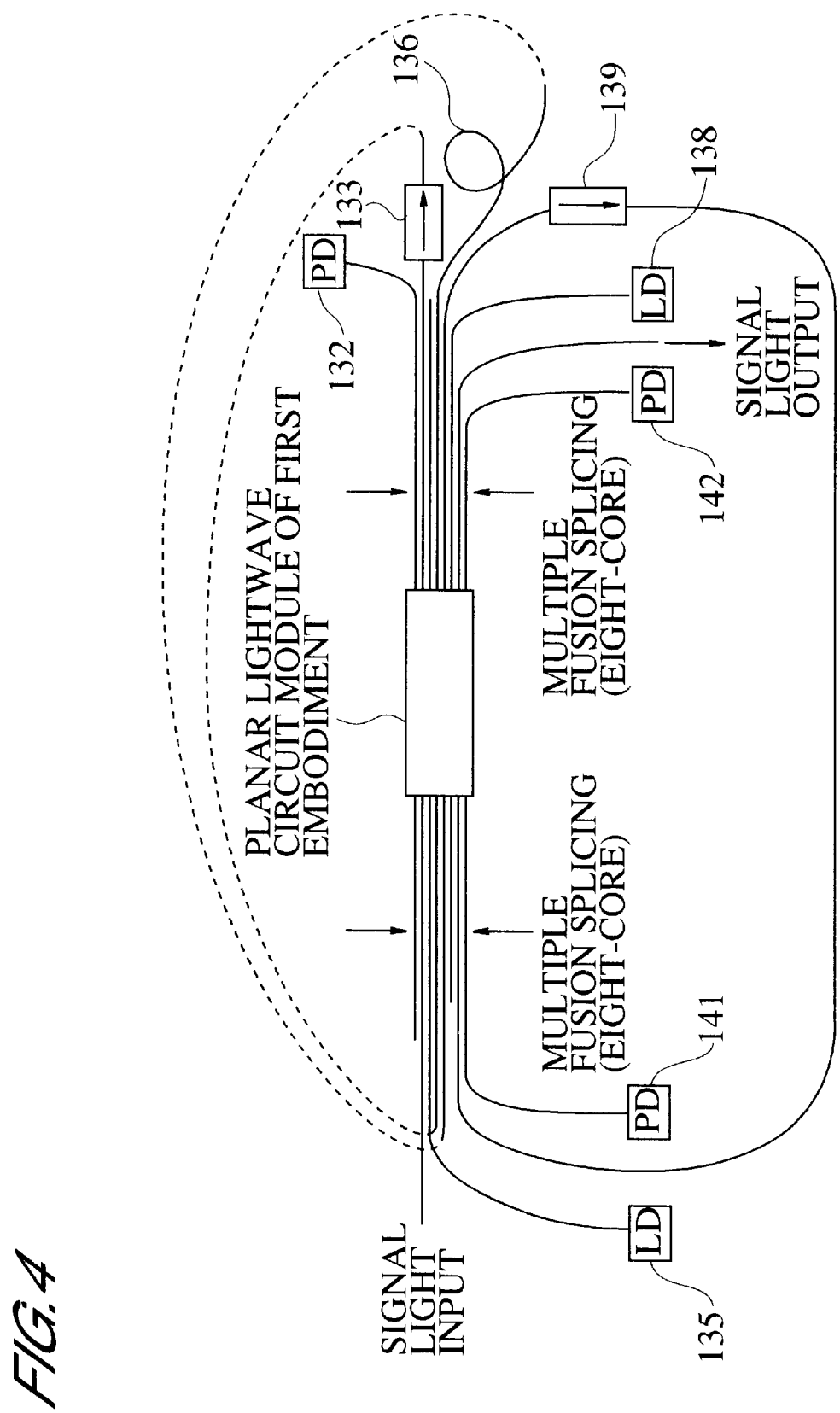
FIG. 4 is a connection diagram of the optical fiber amplifying device according to the first embodiment.

FIG. 4 is a connection diagram illustrating a case in which the other structural elements shown in FIG. 3 are connected to the planar lightwave circuit module shown in FIG. 2.

The optical waveguides may also be of a type configured using a silicon (Si) substrate in the same manner as in the case of memory LSI or the like, of a type in which the waveguides are configured by using a quartz ($SiO_2$) substrate and subjecting this substrate to ion exchange, or the like.

Some of the optical components described here with reference to the structure of the optical fiber amplifying device may be replaced with non-optical components. For example, a structure based solely on forward pumping may be used as the pumping source. The backward pumping WDM 137 can be dispensed with in this case. Conversely, backward pumping alone may be used. Monitoring may also be performed using a structure lacking either of the monitors.

In a planar lightwave circuit module configured as shown in FIG. 2, the dummy fiber ports are provided at three locations, but a structure in which the dummy fibers are dispensed with may also be used (this structure is not shown in the drawings). These dummy ports are provided in order to establish regular intervals between other input ports, output ports, and connection ports.

(A-2) Description of the Operation

As noted above, the planar lightwave circuit module of the first embodiment comprises two optical couplers 131 and 140, and two WDMs 134 and 137. In view of this, the operation of the planar lightwave circuit module of the first embodiment and the operation of an optical fiber amplifying device obtained using the planar lightwave circuit module of the first embodiment will now be described with reference to FIGS. 2 and 3.

Part of signal light inputted from the port P2 is separated by the optical coupler 131 and provided the port P16. The remaining major portion of signal light is outputted to the port P15. Part of the input signal light outputted from the port P16 is provided to the input power monitoring PD 132 connected to the port P16.

Signal light outputted to the port P15 by the optical coupler 131 is multiplexed by WDM 134 with the pumping light from the forward pumping LD 135 inputted from the port P3. The multiplexed signal light and pumping light are outputted to the port P15.

The pumping light and signal light outputted from the port P15 are passed through the optical isolator 133 and inputted to the port P4 of a waveguide device. When reflected light enters an amplifying fiber, the pumping light is used to amplify the reflected light, so the resulting amplified and reflected light creates noise. Thus, optical isolators are generally used to prevent reflected light from being inputted to the amplifying fiber. The optical isolator 139 is used for the same purpose.

The signal light and pumping light inputted to the port P4 are passed through a waveguide formed in a planar lightwave circuit module to the port P13, and provided to the amplifying fiber 136. Meanwhile, the pumping light outputted by the backward pumping LD 138 is inputted to the port P11, multiplexed with signal light by WDM 137, and provided to the amplifying fiber 136 through the port P5.

The amplifying optical fiber 136 is provided with backward pumping light from the port P5 and with forward pumping light and signal light from the port P13, and the signal light is amplified in the amplifying optical fiber. The amplified signal light is inputted to the port P5 of the waveguide device and separated from pumping light by WDM 137, and signal light alone is outputted to the port P12.

The signal light outputted by the port P12 is passed through the optical isolator 139 and inputted to the port P7. Part of the signal light inputted to the port P7 is taken out by the optical coupler 140 and outputted to the port P9. The light outputted by the port P9 is provided to the output power monitoring PD 142, which is connected to the port P9.

Most of the signal light inputted to the port P7 is outputted as amplified light through the port P10. Specifically, port P10 serves as an output of the optical fiber amplifying device.

Reflected light from port 10 itself or from the optical connectors, optical components, instrumentation, or the like outside the planar lightwave circuit module connected to the port P10 is inputted through the port P10 to the planar lightwave circuit module. Part of the reflected light inputted through the port P10 is separated by the optical coupler 140 and outputted to the port P8. A reflected light monitoring PD 141 is connected to the port P8.

In this arrangement, the reflected light monitoring PD 141 is used to detect that the output light connector of the port P10 has been disconnected and to immediately reduce the output power of the pumping source in a controlled manner upon detecting that the output light connector has been disconnected. A particular reason for providing this function is to prevent human eye from being damaged by the high output level of amplified signal light.

FIG. 4 is a block diagram of a specific optical fiber amplifying device. In this example, multiple fusion splicing (eight-fibers) is used to connect optical waveguides, LDs, PDs, optical isolators, and other externally mounted optical components. The use of multiple fusion splicing makes it possible to complete an optical amplifier by fusing an optical waveguide at a single location on each side. It is apparent that an optical amplifier may also be fabricated by fusing each optical component at a single location by means of single fusion splicing.

(A-3) Description of Advantageous Effects

Thus, the first embodiment can contribute to a reduction in the number of components, in the dimensions of the product, and in the number of assembly steps because optical couplers and WDMs are configured as optical waveguides at a common substrate, and a planar lightwave circuit module obtained by integrating these optical couplers and WDMs is provided. Another merit is that because the device is composed of waveguides, there is no need to fix the structural elements in place at precise locations, and a contribution can be made to achieving a smaller number of assembly steps. Yet another merit is that because the input and output units (ports) are fixed in place, multiple fusion splicing can be employed, and a contribution can be made to achieving a smaller number of assembly steps.

Another merit of the optical fiber amplifying device according to the present invention is that the optical amplification characteristics thereof are prevented from being adversely affected (from undergoing concentration extinction) because the amplifying optical fibers are not configured as waveguides.

It is also possible to obtain a planar lightwave circuit module in which the required optical components are formed in an optical waveguide fashion independent of the required amplification media.

In addition, an optical fiber amplifier can be formed by merely connecting amplifying fibers to this planar lightwave circuit module. Furthermore, adopting the optical fiber amplifier of the present invention allows all the inter-component connections necessary for this optical fiber amplifier to be made with the aid of a single planar lightwave circuit module.

(B) Second Embodiment

A second embodiment, which is obtained using the planar lightwave circuit module for optical fiber amplifying devices and an optical fiber amplifying device that pertain to the present invention, will now be described in detail with reference to the drawings.

(B-1) Description of the Structure

Figure 5:
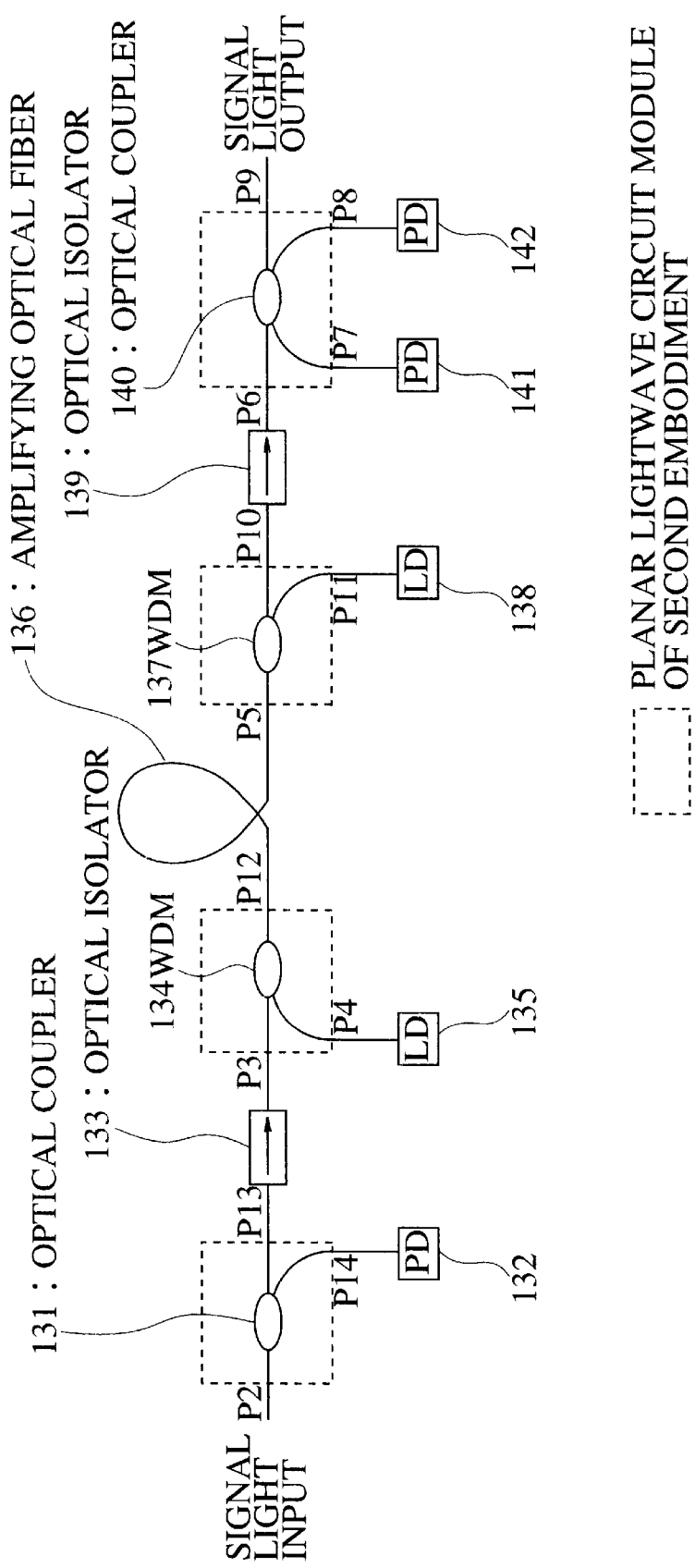
FIG. 5 is a block diagram depicting the structure of the optical fiber amplifying device according to a second embodiment.

FIG. 5 is a block diagram depicting the structure of the optical fiber amplifying device according to the second embodiment. In FIG. 5, the same symbols are used to designate structural components that correspond to the structure of the first embodiment shown in FIG. 3.

In FIG. 5, the optical fiber amplifying device of the second embodiment comprises optical couplers 131 and 140, an input power monitoring PD 132, optical isolators 133 and 139, WDMs 134 and 137, a forward pumping LD 135, an amplifying fiber 136, a backward pumping LD 138, a reflected light monitoring PD 141, and an output monitoring PD 142.

The optical fiber amplifying device of the second embodiment has the same structural elements as the first embodiment described above. In addition, the optical couplers 131 and 140, and WDMs 134 and 137 are configured as optical waveguides. These optical couplers and WDMs are integrated at a single substrate so as to yield a planar lightwave circuit module. In FIG. 5, structural components corresponding to this optical waveguide device are circled by a broken line.

The optical fiber amplifying device of the second embodiment differs from the device of the first embodiment, however, in that the connection positions of the optical isolator 133 and WDM 134 are reversed. Consequently, the manner in which the connections among the structural elements are related to each other is somewhat different from the one provided to the planar lightwave circuit module of the first embodiment.

Figure 6:
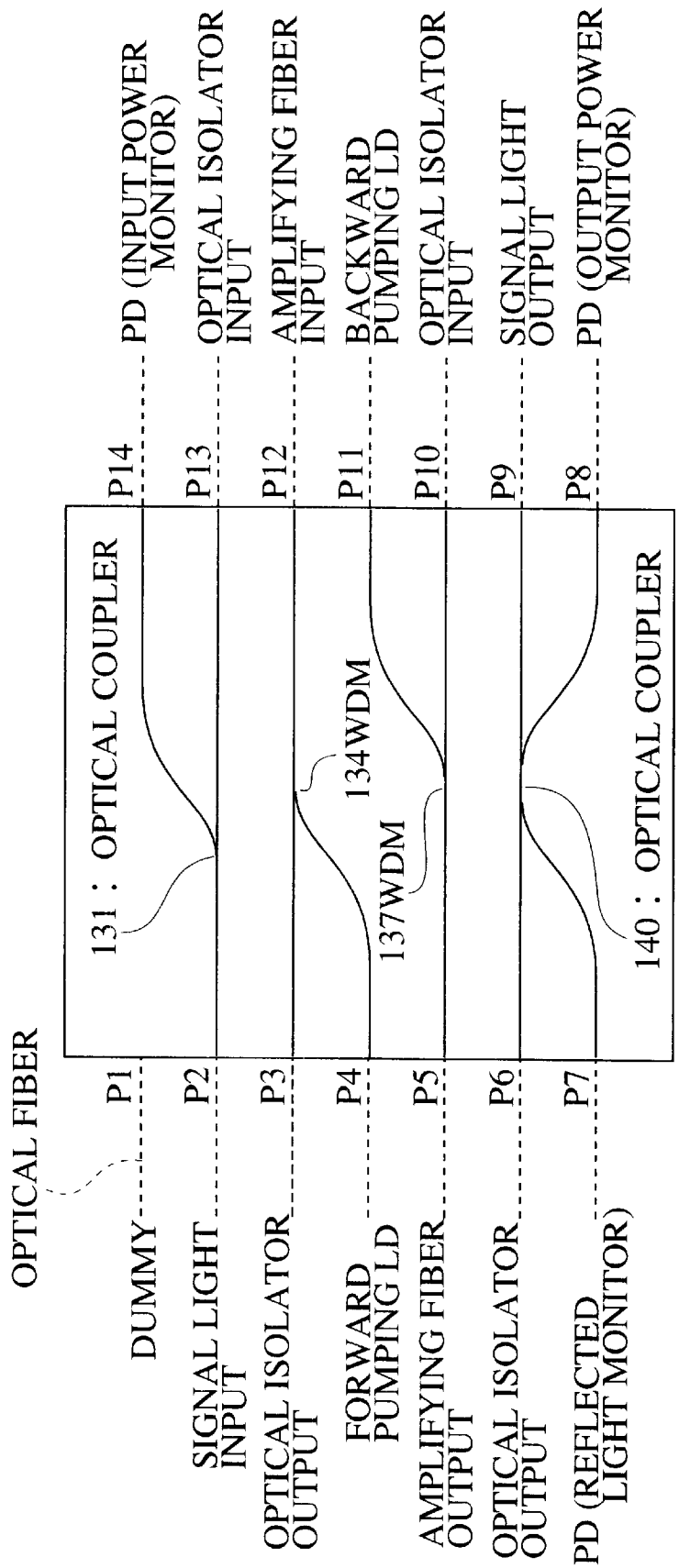
FIG. 6 is a diagram depicting a detailed structure of the optical waveguide device according to the second embodiment.

FIG. 6 is a diagram depicting a detailed structure of the planar lightwave circuit module according to the second embodiment. In FIG. 6, the same symbols are used to designate structural components that correspond to the block diagram shown in FIG. 5.

In FIG. 6, the planar lightwave circuit module of the second embodiment comprises optical couplers 131 and 140, and WDMs 134 and 137. The planar lightwave circuit module further comprises 14 ports P1–P14 for forming connections with optical fibers.

Here, connections among the ports are related in the following manner.

P1: dummy optical fiber
P2: signal light input
P3: first optical isolator output
P4: forward pumping LD
P5: amplifying optical fiber output
P6: second optical isolator output
P7: reflected light monitoring PD
P8: output power monitoring PD
P9: signal light output
P10: second optical isolator input
P11: backward pumping LD
P12: amplifying optical fiber input
P13: first optical isolator input
P14: input power monitoring PD The second embodiment is configured such that all the ports P1–P7 on the left side of the planar lightwave circuit module shown in FIG. 6 are input ports, and all the ports P8–P14 on the right side are output ports.

(B-2) Description of the Operation

As noted above, the optical fiber amplifying device of the second embodiment differs from the device of the first embodiment in that the connection positions of the optical isolator 133 and WDM 134 are reversed. The basic operation is the same as in the first embodiment, however.

Consequently, the operation of the planar lightwave circuit module of the second embodiment and the operation of an optical fiber amplifying device obtained using the planar lightwave circuit module of the second embodiment will now be briefly described in different points from the first embodiment with reference to FIGS. 5 and 6.

Part of signal light inputted from the port P2 is separated by the optical coupler 131 and provided to the port P14. The remaining major portion of signal light is outputted to the port P13 and provided to the optical isolator 133. Part of the input signal light outputted from the port P14 is provided to the input power monitoring PD 132 connected to the port P14.

The output of the optical isolator 133 is connected to the port P3. Signal light from the optical isolator 133 inputted through the port P3 is multiplexed by WDM 134 with the forward pumping light inputted through the port P4. The multiplexed signal light and pumping light are outputted to the port P12.

The subsequent operation is the same as in the first embodiment, and is therefore omitted from the description (the port numbers are different, however).

(B-3) Description of Advantageous Effects

Thus, the second embodiment provides optical isolators and WDMs with a reverse connection relationship but has the same merits as the first embodiment.

It is apparent that the optical fiber amplifying devices of both the first embodiment and the second embodiment can operate as optical amplifiers, and are thus widely used. Distinctive features of each device are described below.

First embodiment: An advantage is that the forward pumping LD 135 does not require any optical isolators because forward pumping light is also passed through the optical isolator 133. A drawback, however, is that the pumping light inputted to the amplifying fiber 136 is weak because this light is affected by the losses in the optical isolator 133.

Second embodiment: Involves an opposite arrangement in comparison with that provided by the above-described first embodiment. An optical isolator 133 is needed for the forward pumping LD 135, but because the pumping light inputted to the amplifying fiber 136 is not affected by the losses in the optical isolator 133, more powerful pumping light can be inputted than in the first embodiment.

(C) Third Embodiment

A third embodiment, which is obtained using the planar lightwave circuit module for optical fiber amplifying devices and an optical fiber amplifying device that pertain to the present invention, will now be described in detail with reference to the drawings.

Figure 7:
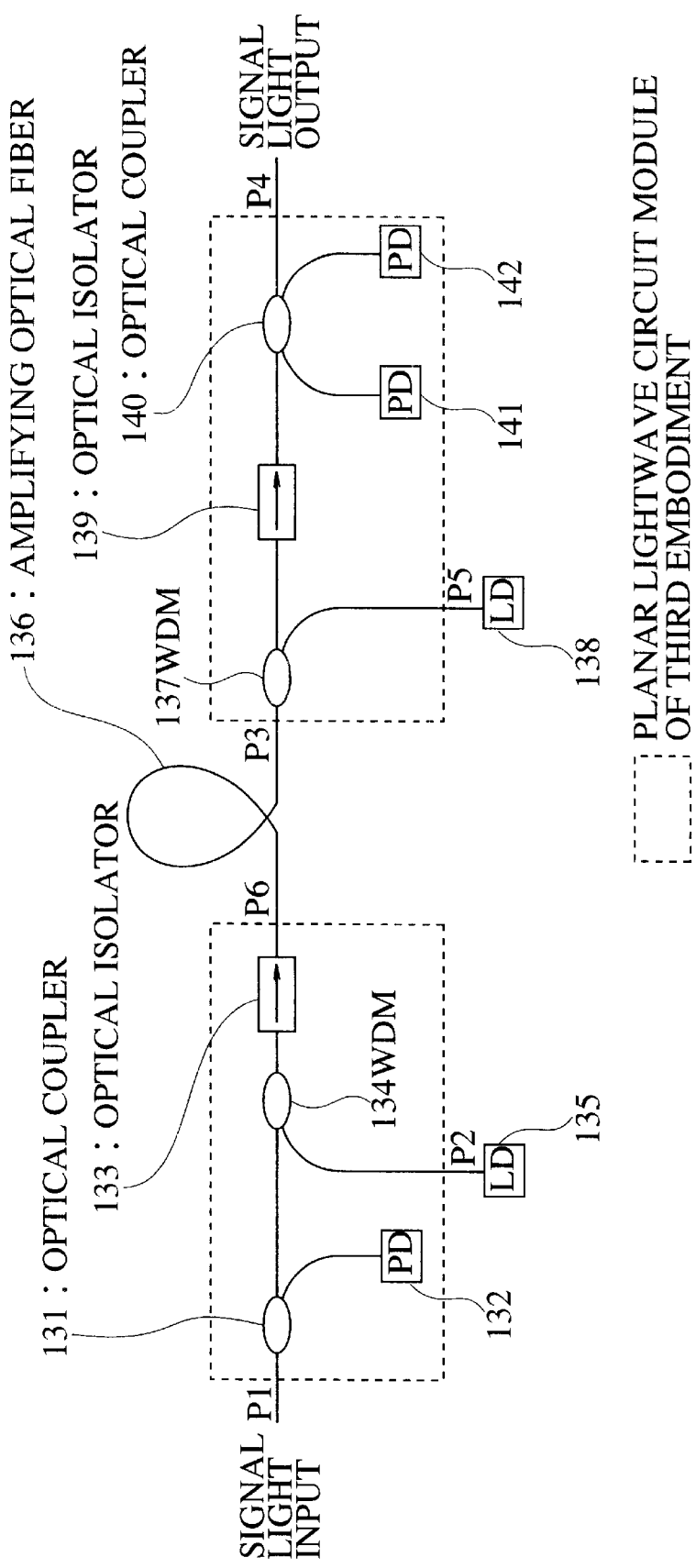
FIG. 7 is a block diagram depicting the structure of the optical fiber amplifying device according to a third embodiment.

FIG. 7 is a block diagram depicting the structure of the optical fiber amplifying device according to the third embodiment. In FIG. 7, the same symbols are used to designate structural components that correspond to the structure of the first embodiment shown in FIG. 3.

In FIG. 7, the optical fiber amplifying device of the third embodiment comprises optical couplers 131 and 140, an input power monitoring PD 132, optical isolators 133 and 139, WDMs 134 and 137, a forward pumping LD 135, an amplifying fiber 136, a backward pumping LD 138, a reflected light monitoring PD 141, and an output monitoring PD 142.

The optical fiber amplifying device of the third embodiment has the same structural elements as the first embodiment described above. In addition, the optical couplers 131 and 140, and WDMs 134 and 137 are configured as optical waveguides. These optical couplers and WDMs are made into a unitary structure at a substrate, thereby yielding a planar lightwave circuit module.

In the optical fiber amplifying device of the third embodiment, however, other structural components besides the optical components 131, 140, 134, and 137 are integrated into a planar lightwave circuit module. Specifically, the optical isolators 133 and 139, and the photodetectors (PDs) 132, 141, and 142, which are mounted externally in the first embodiment, are further integrated or otherwise incorporated. These optical isolators and photodetectors (PDs) are assembled as a unitary structure in and/or on a substrate, thereby yielding a planar lightwave circuit module. In FIG. 7, structural components corresponding to this planar lightwave circuit module are circled by a broken line. Following is a detailed description of this planar lightwave circuit module.

Figure 8:
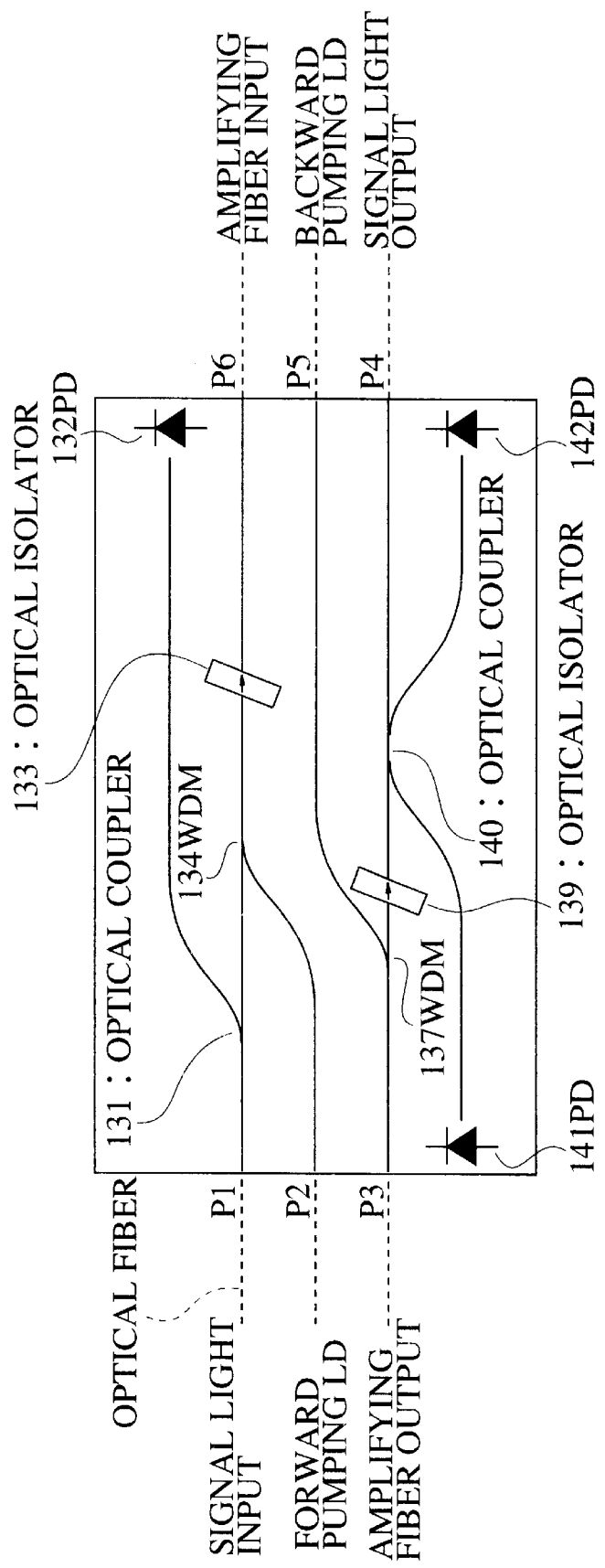
FIG. 8 is a diagram depicting a detailed structure of the optical waveguide device according to the third embodiment.

FIG. 8 is a diagram depicting a detailed structure of the planar lightwave circuit module according to the third embodiment. In FIG. 8, structural components corresponding to the block diagram shown in FIG. 7 are designated using the same symbols.

In FIG. 8, the planar lightwave circuit module of the third embodiment comprises optical couplers 131 and 140, WDMs 134 and 137, an input power monitoring PD 132, optical isolators 133 and 139, a reflected light monitoring PD 141, and an output monitoring PD 142. The planar lightwave circuit module further comprises six ports P1–P6 for forming connections with optical fibers.

Following is a description of the manner in which the ports are connected to each other.

P1: signal light input
P2: forward pumping LD
P3: amplifying optical fiber output
P4: signal light output
P5: backward pumping LD
P6: amplifying optical fiber input The third embodiment is configured such that all the ports P1–P3 on the left side of the planar lightwave circuit module shown in FIG. 8 are input ports, and all the ports P4–P6 on the right side are output ports.

As noted above, the optical fiber amplifier of the third embodiment is such that optical isolators and photodetectors (PDs) are integrated with a substrate in addition to the optical components configured as optical waveguides according to the first embodiment. Specifically, these optical isolators and photodetectors (PDs) form a unitary structure with the planar lightwave circuit module. The basic operation is the same as in the first embodiment, however.

There is, therefore, no need to describe the operation of the planar lightwave circuit module of the third embodiment, or the operation of an optical fiber amplifying device obtained using the planar lightwave circuit module of the third embodiment.

Thus, the third embodiment has the same merits as the first embodiment.

In addition, the third embodiment can further contribute to a reduction in dimensions and in the number of assembly steps in comparison with the first embodiment because optical isolator and photodetectors (PDs) can also be made into a unitary structure with the planar lightwave circuit module and because the number of externally mounted components can be reduced.

(D) Fourth Embodiment

A fourth embodiment, which is obtained using the planar lightwave circuit module for optical fiber amplifying devices and an optical fiber amplifying device that pertain to the present invention, will now be described in detail with reference to the drawings.

Figure 9:
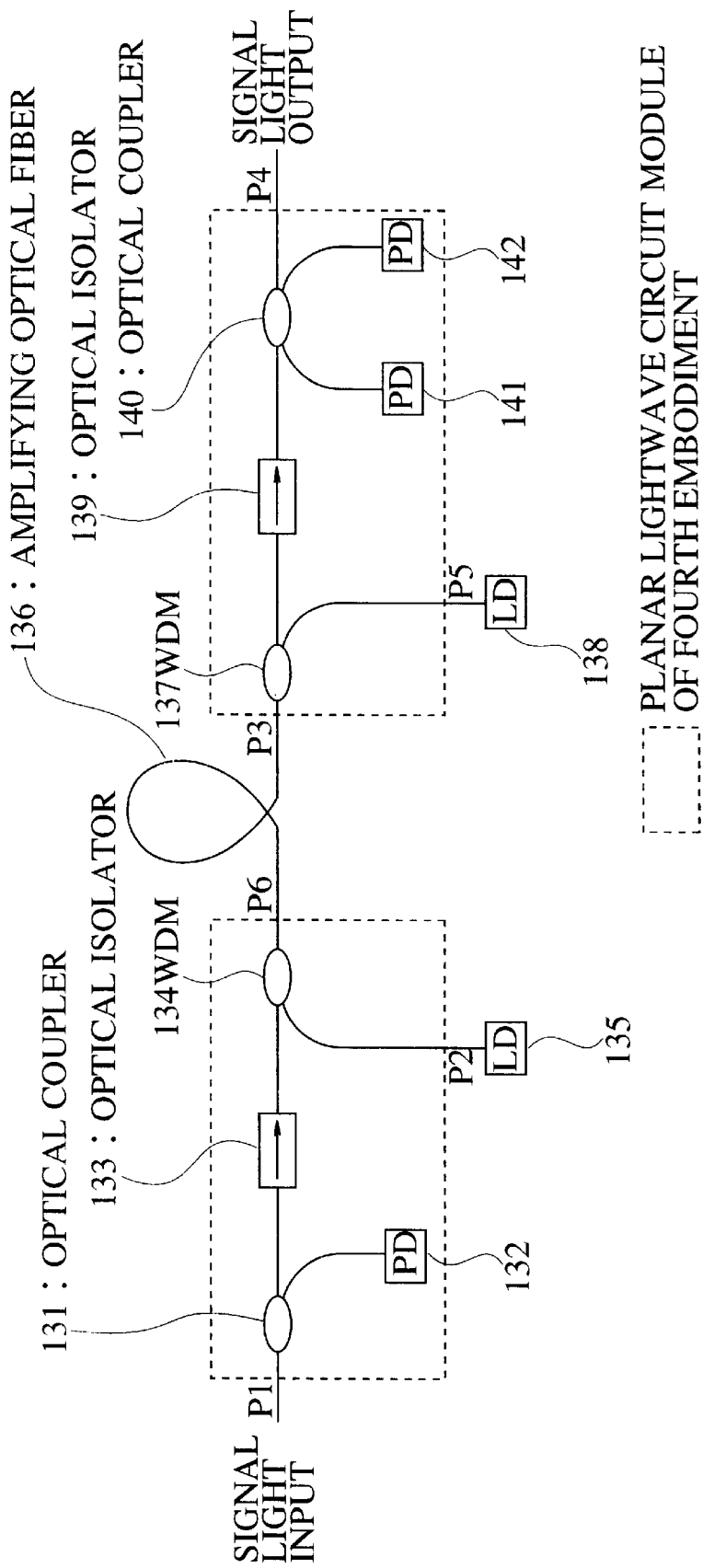
FIG. 9 is a block diagram depicting the structure of the optical fiber amplifying device according to a fourth embodiment.

FIG. 9 is a block diagram depicting the structure of the optical fiber amplifying device according to the fourth embodiment. In FIG. 9, the same symbols are used to designate structural components that correspond to the structure of the second embodiment shown in FIG. 5.

In FIG. 9, the optical fiber amplifying device of the fourth embodiment comprises optical couplers 131 and 140, an input power monitoring PD 132, optical isolators 133 and 139, WDMs 134 and 137, a forward pumping LD 135, an amplifying fiber 136, a backward pumping LD 138, a reflected light monitoring PD 141, and an output monitoring PD 142.

The optical fiber amplifying device of the fourth embodiment has the same structural elements as the second embodiment described above. In addition, the optical couplers 131 and 140, and WDMs 134 and 137 are configured as optical waveguides. These optical couplers and WDMs are integrated in and/or on a single substrate, thereby yielding a planar lightwave circuit module.

However, the optical fiber amplifying device of the fourth embodiment pertains to an example in which structural components are integrated in addition to the above-described optical components 131, 140, 134, and 137. Specifically, the optical isolators 133 and 139, and the photodetectors (PDs) 132, 141, and 142, which are mounted externally in the second embodiment, are further integrated. These optical isolators and photodetectors (PDs) are assembled as a unitary structure at a substrate, thereby yielding a planar lightwave circuit module. In FIG. 9, structural components corresponding to this planar lightwave circuit module are circled by a broken line. Following is a description of this planar lightwave circuit module.

Figure 10:
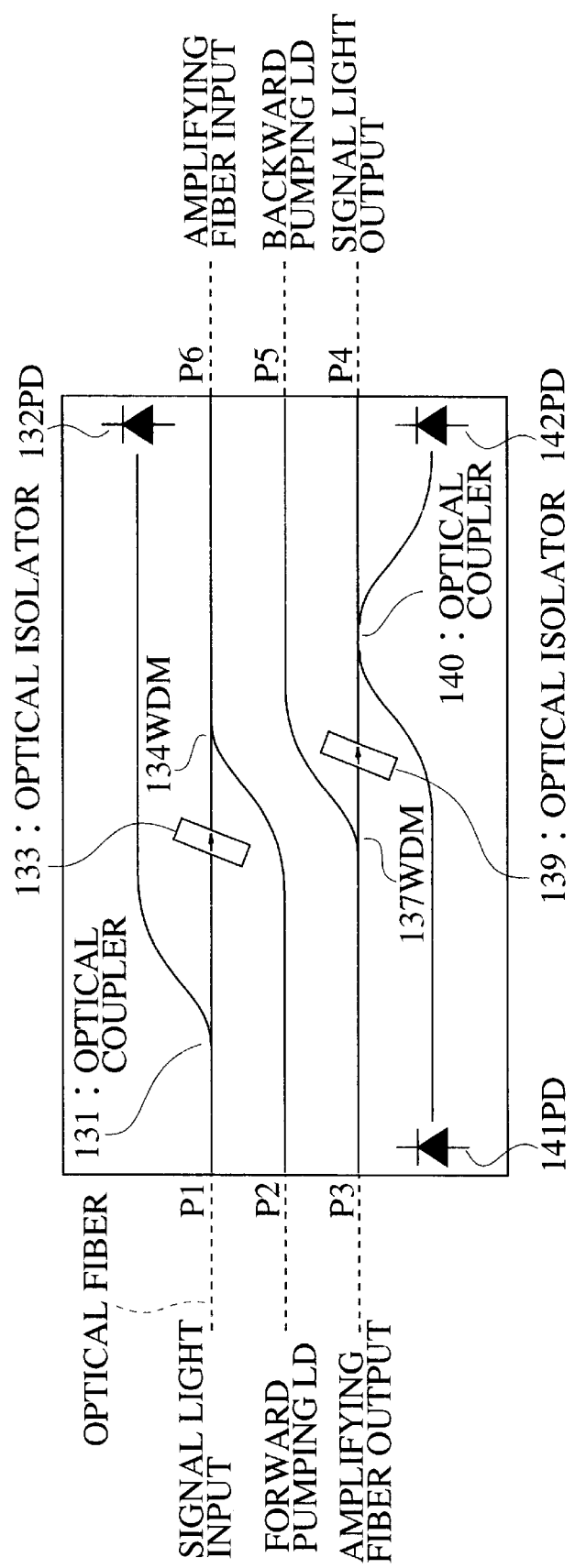
FIG. 10 is a diagram depicting a detailed structure of the optical waveguide device according to the fourth embodiment.

FIG. 10 is a diagram depicting a detailed structure of the planar lightwave circuit module according to the fourth embodiment. In FIG. 10, structural components corresponding to the block diagram shown in FIG. 9 are designated using the same symbols.

In FIG. 10, the planar lightwave circuit module of the fourth embodiment comprises optical couplers 131 and 140, WDMs 134 and 137, an input power monitoring PD 132, optical isolators 133 and 139, a reflected light monitoring PD 141, and an output monitoring PD 142. The planar lightwave circuit module further comprises six ports P1–P6 for forming connections with optical fibers.

Here, connections among the ports are related in the following manner.

P1: signal light input
P2: forward pumping LD
P3: amplifying optical fiber output
P4: signal light output
P5: backward pumping LD
P6: amplifying optical fiber input The fourth embodiment is configured such that all the ports P1–P3 on the left side of the planar lightwave circuit module shown in FIG. 10 are input ports, and all the ports P4–P6 on the right side are output ports.

As noted above, the planar lightwave circuit module of the fourth embodiment is such that optical isolators and photodetectors (PDs) are integrated in addition to the optical components configured as waveguides according to the second embodiment. Specifically, these optical isolators and photodetectors (PDs) are integrated and made into a unitary structure at a substrate in addition to the above-described optical components, thereby yielding a planar lightwave circuit module. The basic operation is the same as in the second embodiment, however.

There is, therefore, no need to describe the operation of the planar lightwave circuit module of the fourth embodiment, or the operation of an optical fiber amplifying device obtained using the planar lightwave circuit module of the fourth embodiment.

Thus, the fourth embodiment has the same merits as the second embodiment.

In addition, the fourth embodiment can further contribute to a reduction in dimensions and in the number of assembly steps in comparison with the second embodiment because optical isolator photodetectors (PDs) can also be made into a unitary structure with the planar lightwave circuit module and because the number of externally mounted components can be reduced.

(E) Fifth Embodiment

A fifth embodiment, which is obtained using the planar lightwave circuit module for optical fiber amplifying devices and an optical fiber amplifying device that pertain to the present invention, will now be described in detail with reference to the drawings.

Figure 11:
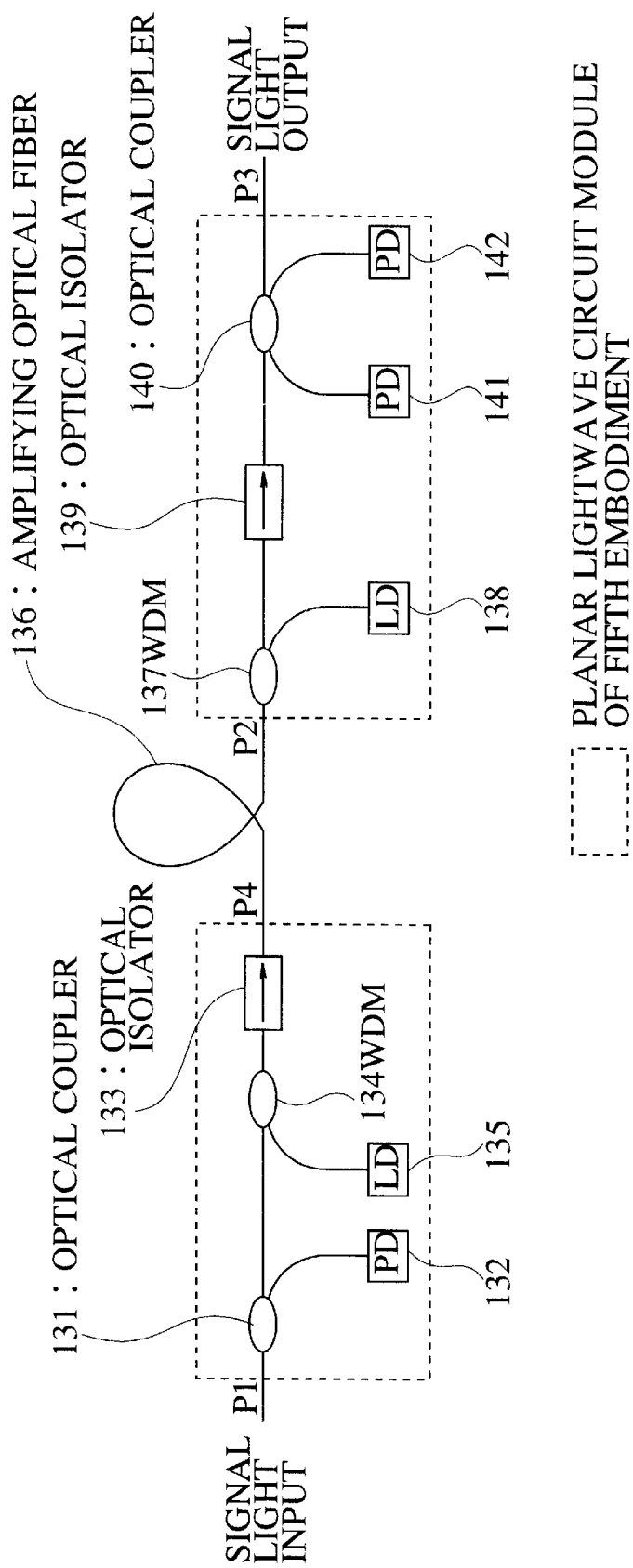
FIG. 11 is a block diagram depicting the structure of the optical fiber amplifying device according to a fifth embodiment.

FIG. 11 is a block diagram depicting the structure of the optical fiber amplifying device according to the fifth embodiment. In FIG. 11, the same symbols are used to designate structural components that correspond to the structure of the third embodiment shown in FIG. 7.

In FIG. 11, the optical fiber amplifying device of the fifth embodiment comprises optical couplers 131 and 140, an input power monitoring PD 132, optical isolators 133 and 139, WDMs 134 and 137, a forward pumping LD 135, an amplifying fiber 136, a backward pumping LD 138, a reflected light monitoring PD 141, and an output monitoring PD 142.

The optical fiber amplifying device of the fifth embodiment has the same structural elements as the third embodiment described above. In addition, the optical couplers 131 and 140, and WDMs 134 and 137 are configured as optical waveguides. The optical isolators 133 and 139, and the photodetectors (PDs) 132, 141, and 142 are also integrated. Specifically, these optical couplers, WDMs, optical isolators, and photodetectors (PDs) are assembled into a unitary structure at a substrate, thereby yielding a planar lightwave circuit module.

However, the optical fiber amplifying device of the fifth embodiment pertains to an example in which structural components are integrated in addition to the above-described optical components 131, 140, 134, 137, 133, 139, 132, 141, and 142. Specifically, the pumping LDs 135 and 138, which are mounted externally in the third embodiment, are further integrated in this structural example, and these pumping LDs are assembled into a unitary structure at a substrate, thereby yielding a planar lightwave circuit module. In FIG. 11, structural components corresponding to this planar lightwave circuit module are circled by a broken line. Following is a description of this planar lightwave circuit module.

Figure 12:
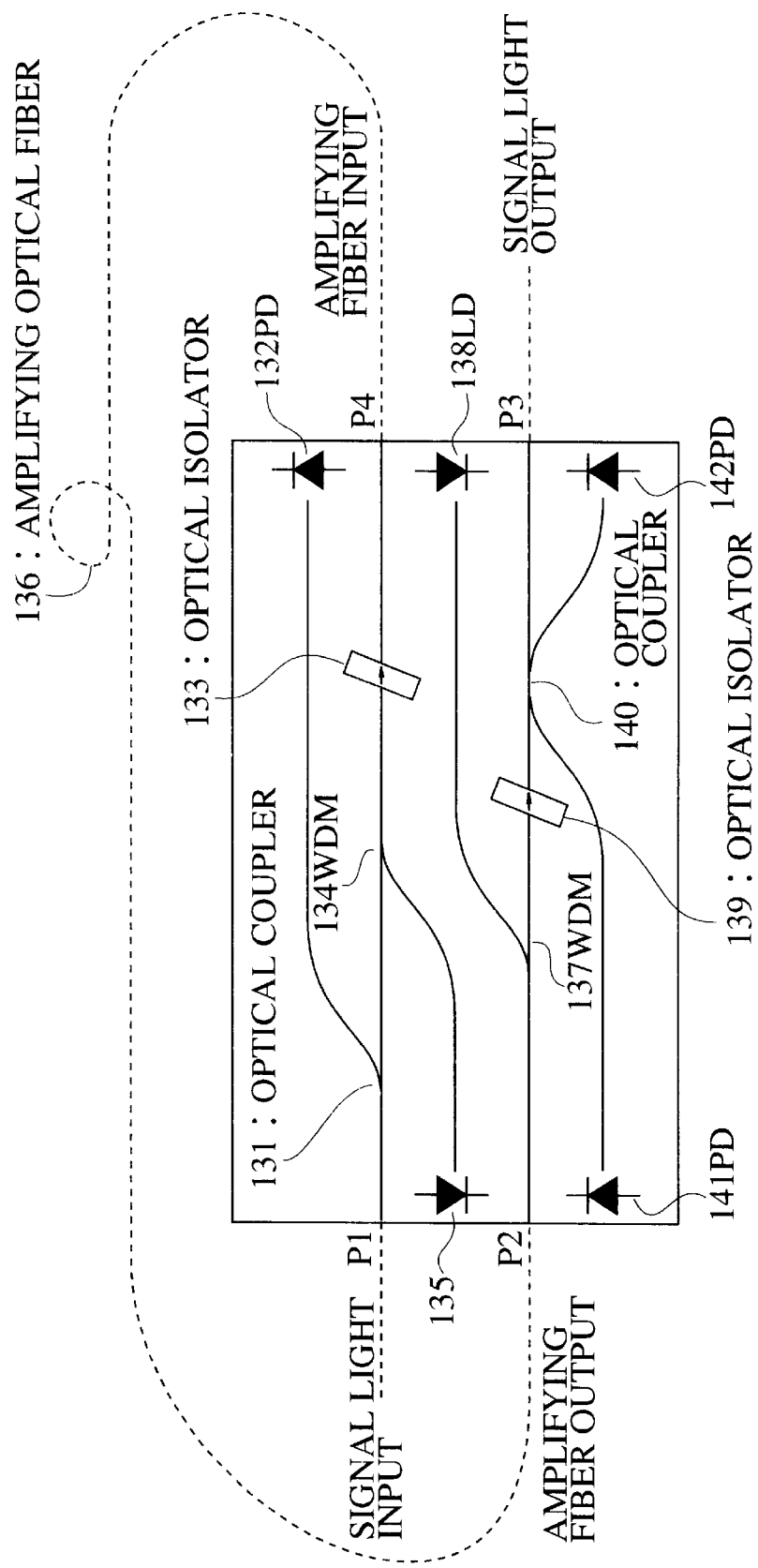
FIG. 12 is a diagram depicting a detailed structure of the optical waveguide device according to the fifth embodiment.

FIG. 12 is a diagram depicting a detailed structure of the planar lightwave circuit module according to the fifth embodiment. In FIG. 12, structural components corresponding to the block diagram shown in FIG. 11 are designated using the same symbols.

In FIG. 12, the planar lightwave circuit module of the fifth embodiment comprises optical couplers 131 and 140, WDMs 134 and 137, an input power monitoring PD 132, optical isolators 133 and 139, a reflected light monitoring PD 141, an output monitoring PD 142, a forward pumping LD 135, and a backward pumping LD 138. The planar lightwave circuit module further comprises four ports P1–P4 for forming connections with four optical fibers.

Here, connections among the ports are related in the following manner.

P1: signal light input
P2: amplifying optical fiber output
P3: signal light output
P4: amplifying optical fiber input The fifth embodiment is configured such that the two ports P1 and P2 on the left side of the planar lightwave circuit module shown in FIG. 12 are input ports, and the two ports P3 and P4 on the right side are output ports.

As noted above, the optical fiber amplifier of the fifth embodiment is such that pumping LDs are integrated in addition to the optical components incorporated as a planar lightwave circuit module according to the third embodiment. Specifically, these pumping LDs are also made into a unitary structure with the planar lightwave circuit module. The basic operation is the same as in the third embodiment, however. There is, therefore, no need to describe the operation of the planar lightwave circuit module of the fifth embodiment, or the operation of an optical fiber amplifying device obtained using the planar lightwave circuit module of the fifth embodiment.

Thus, the fifth embodiment has the same merits as the third embodiment.

In addition, the fifth embodiment can further contribute to a reduction in dimensions and in the number of assembly steps in comparison with the third embodiment because the pumping LDs can also be made into a unitary structure with the planar lightwave circuit module and because the number of externally mounted components can be reduced.

(F) Sixth Embodiment

A sixth embodiment, which is obtained using the planar lightwave circuit module for optical fiber amplifying devices and an optical fiber amplifying device that pertain to the present invention, will now be described in detail with reference to the drawings.

Figure 13:
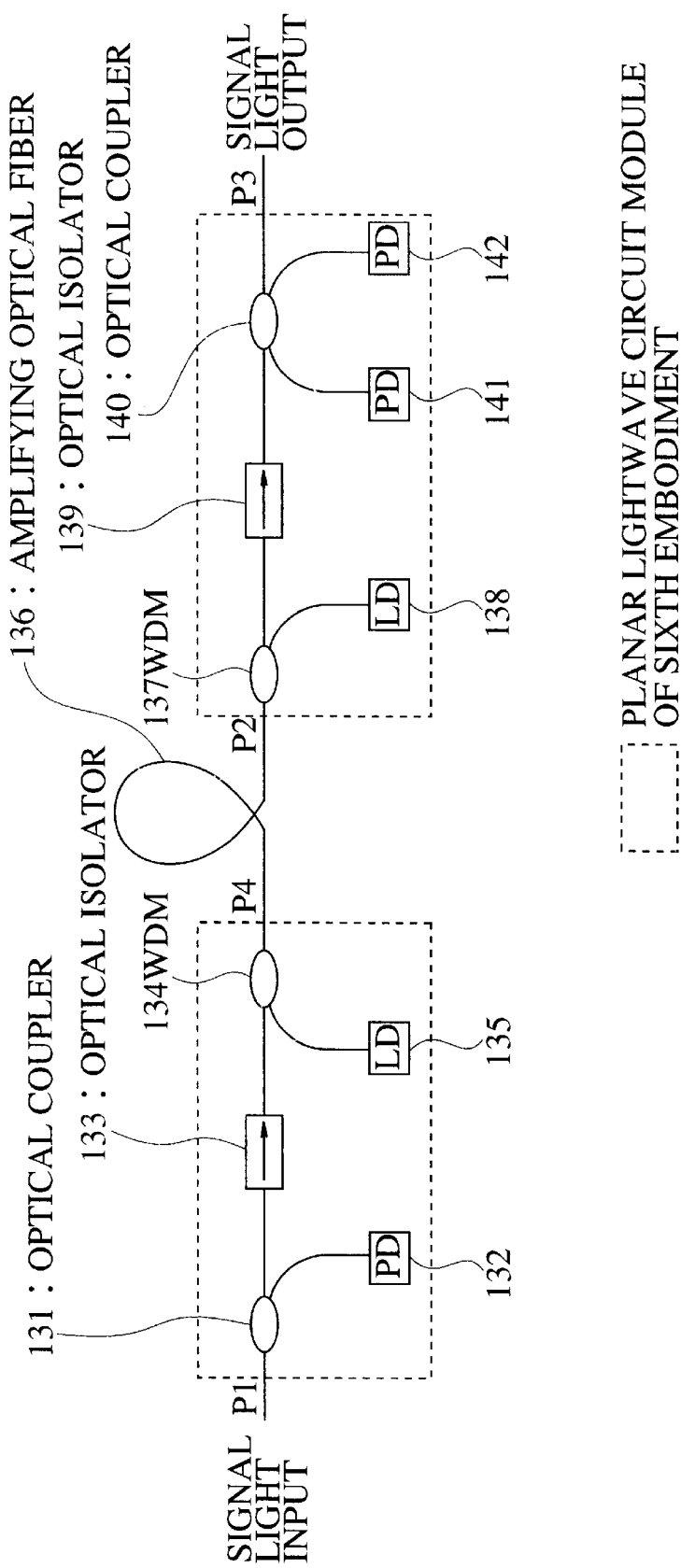
FIG. 13 is a block diagram depicting the structure of the optical fiber amplifying device according to a sixth embodiment.

FIG. 13 is a block diagram depicting the structure of the optical fiber amplifying device according to the sixth embodiment. In FIG. 13, the same symbols are used to designate structural components that correspond to the structure of the fourth embodiment shown in FIG. 9.

In FIG. 13, the optical fiber amplifying device of the sixth embodiment comprises optical couplers 131 and 140, an input power monitoring PD 132, optical isolators 133 and 139, WDMs 134 and 137, a forward pumping LD 135, an amplifying fiber 136, a backward pumping LD 138, a reflected light monitoring PD 141, and an output monitoring PD 142.

The optical fiber amplifying device of the sixth embodiment has the same structural elements as the fourth embodiment described above. In addition, the optical couplers 131 and 140, and WDMs 134 and 137 are configured as optical waveguides. The optical isolators 133 and 139, and the photodetectors (PDs) 132, 141, and 142 are also integrated. Specifically, these optical couplers, WDMs, optical isolators, and photodetectors (PDs) are assembled into a unitary structure at a substrate, thereby yielding a planar lightwave circuit module.

However, the optical fiber amplifying device of the sixth embodiment pertains to an example in which structural components are integrated in addition to the above-described optical components 131, 140, 134, 137, 133, 139, 132, 141, and 142. Specifically, the pumping LDs 135 and 138, which are mounted externally in the fourth embodiment, are further integrated in this structural example, and these pumping LDs are assembled into a unitary structure at a substrate, thereby yielding a planar lightwave circuit module. In FIG. 13, structural components corresponding to this planar lightwave circuit module are circled by a broken line. Following is a description of this planar lightwave circuit module.

Figure 14:
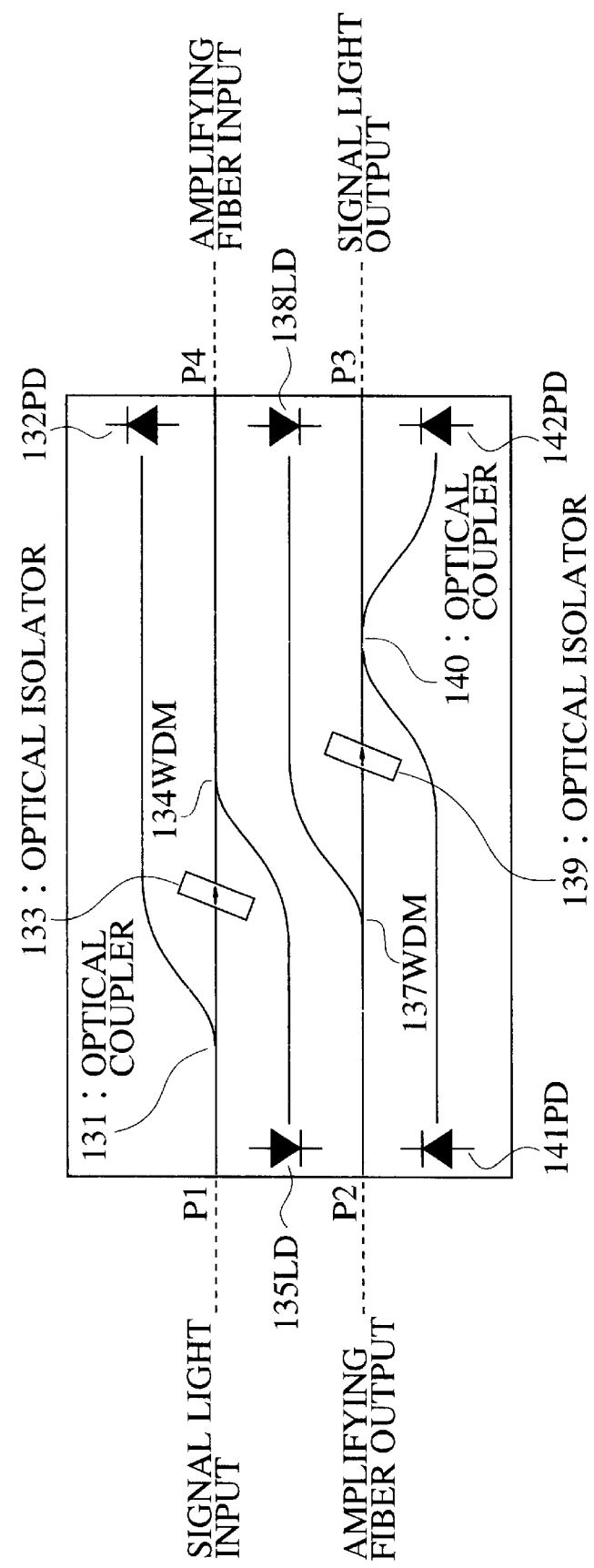
FIG. 14 is a diagram depicting a detailed structure of the optical waveguide device according to the sixth embodiment.

FIG. 14 is a diagram depicting a detailed structure of the planar lightwave circuit module according to the sixth embodiment. In FIG. 14, structural components corresponding to the block diagram shown in FIG. 13 are designated using the same symbols.

In FIG. 14, the planar lightwave circuit module of the sixth embodiment comprises optical couplers 131 and 140, WDMs 134 and 137, an input power monitoring PD 132, optical isolators 133 and 139, a reflected light monitoring PD 141, an output monitoring PD 142, a forward pumping LD 135, and a backward pumping LD 138. The planar lightwave circuit module further comprises four ports P1–P4 for forming connections with four optical fibers.

Here, connections among the ports are related in the following manner.

P1: signal light input

P2: amplifying optical fiber output

P3: signal light output

P4: amplifying optical fiber input

The sixth embodiment is configured such that the two ports P1 and P2 on the left side of the planar lightwave circuit module shown in FIG. 14 are input ports, and the two ports P3 and P4 on the right side are output ports.

As noted above, the optical fiber device of the sixth embodiment is such that pumping LDs are integrated in addition to the optical components incorporated as a planar lightwave circuit module according to the fourth embodiment. Specifically, these pumping LDs are also made into a unitary structure with the planar lightwave circuit module. The basic operation is the same as in the fourth embodiment, however.

There is, therefore, no need to describe the operation of the planar lightwave circuit module of the sixth embodiment, or the operation of an optical fiber amplifying device obtained using the planar lightwave circuit module of the sixth embodiment.

Thus, the sixth embodiment has the same merits as the fourth embodiment.

In addition, the sixth embodiment can further contribute to a reduction in dimensions and in the number of assembly steps in comparison with the fourth embodiment because pumping LDs can also be made into a unitary structure with the planar lightwave circuit module and because the number of externally mounted components can be reduced.

(G) Seventh Embodiment

A seventh embodiment, which is obtained using the planar lightwave circuit module for optical fiber amplifying devices and an optical fiber amplifying device that pertain to the present invention, will now be described in detail with reference to drawings.

Figure 15:
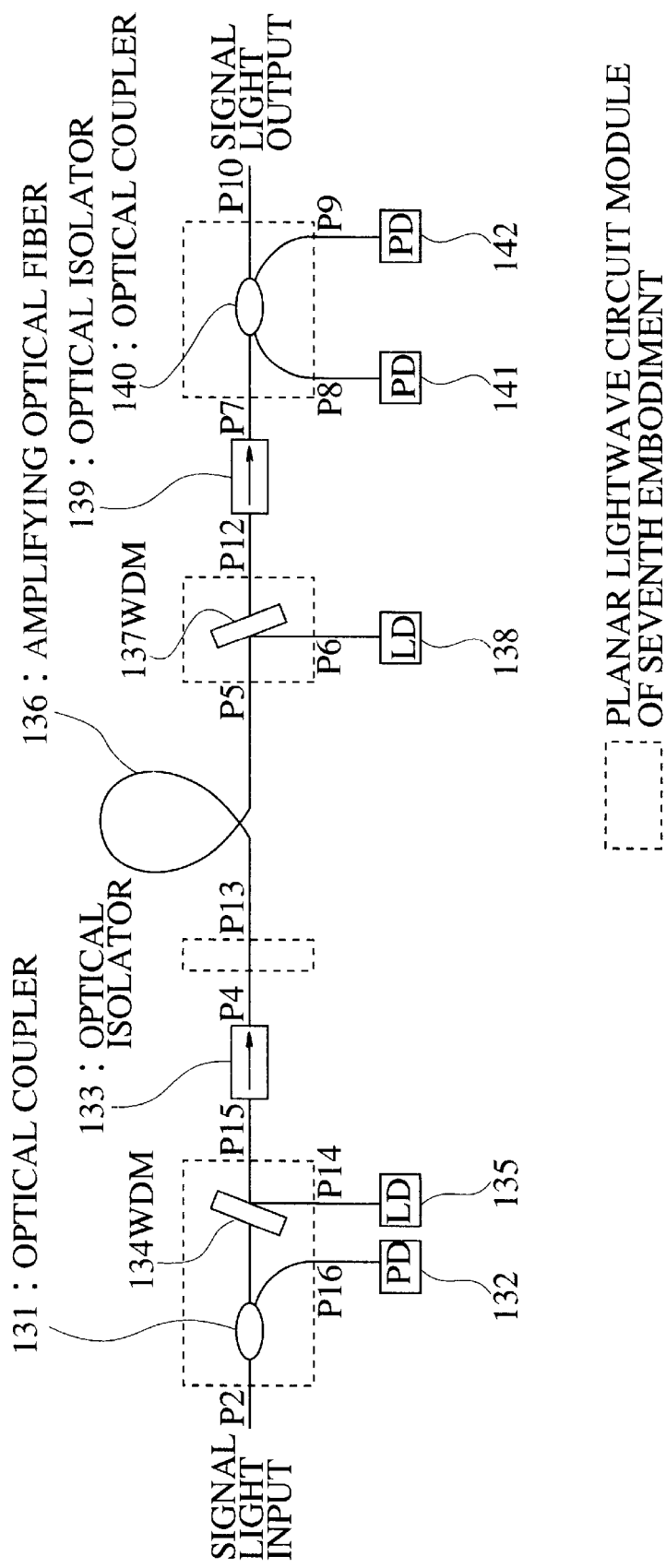
FIG. 15 is a block diagram depicting the structure of the optical fiber amplifying device according to a seventh embodiment.
Figure 16:
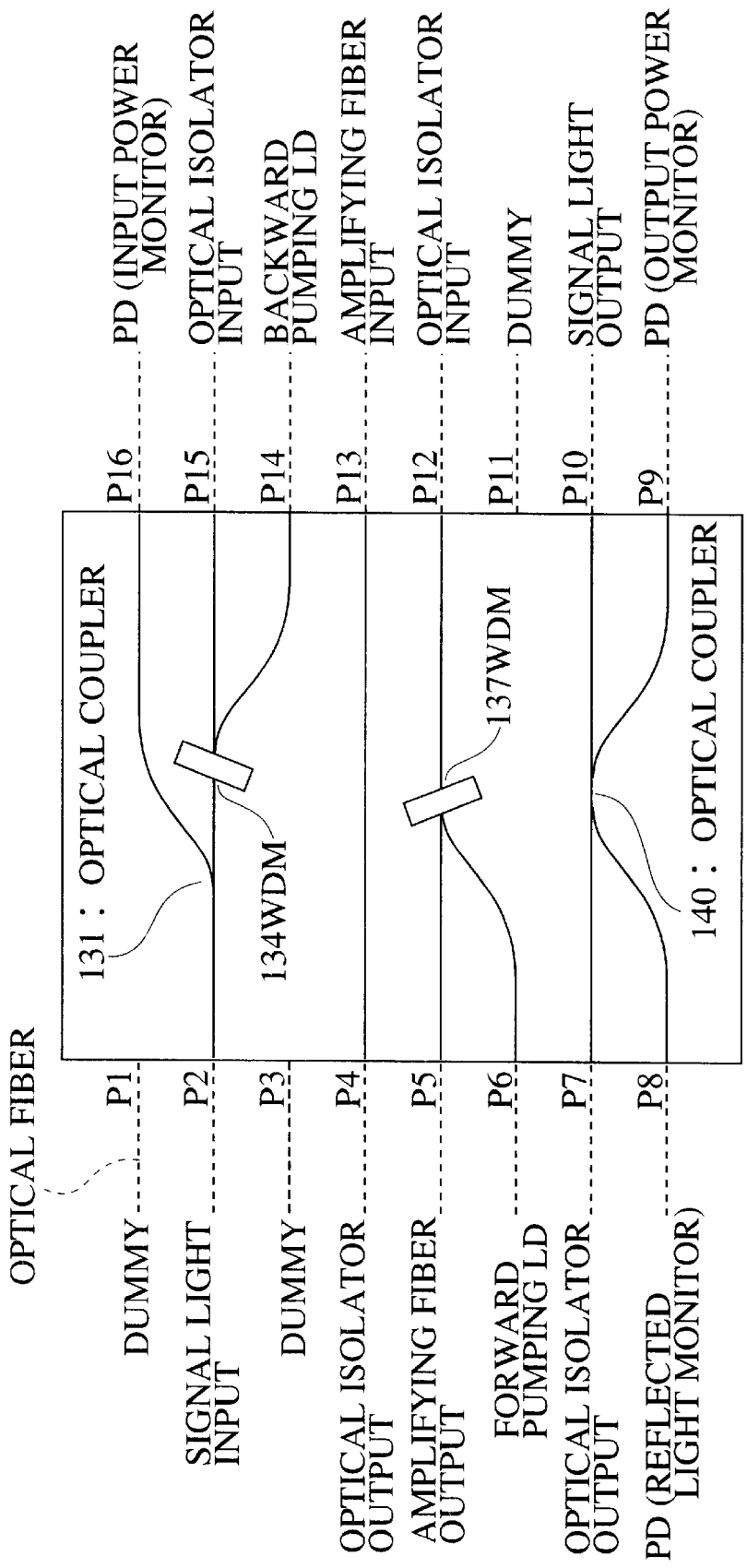
FIG. 16 is a diagram depicting a detailed structure of the optical waveguide device according to the seventh embodiment.
Figure 17:
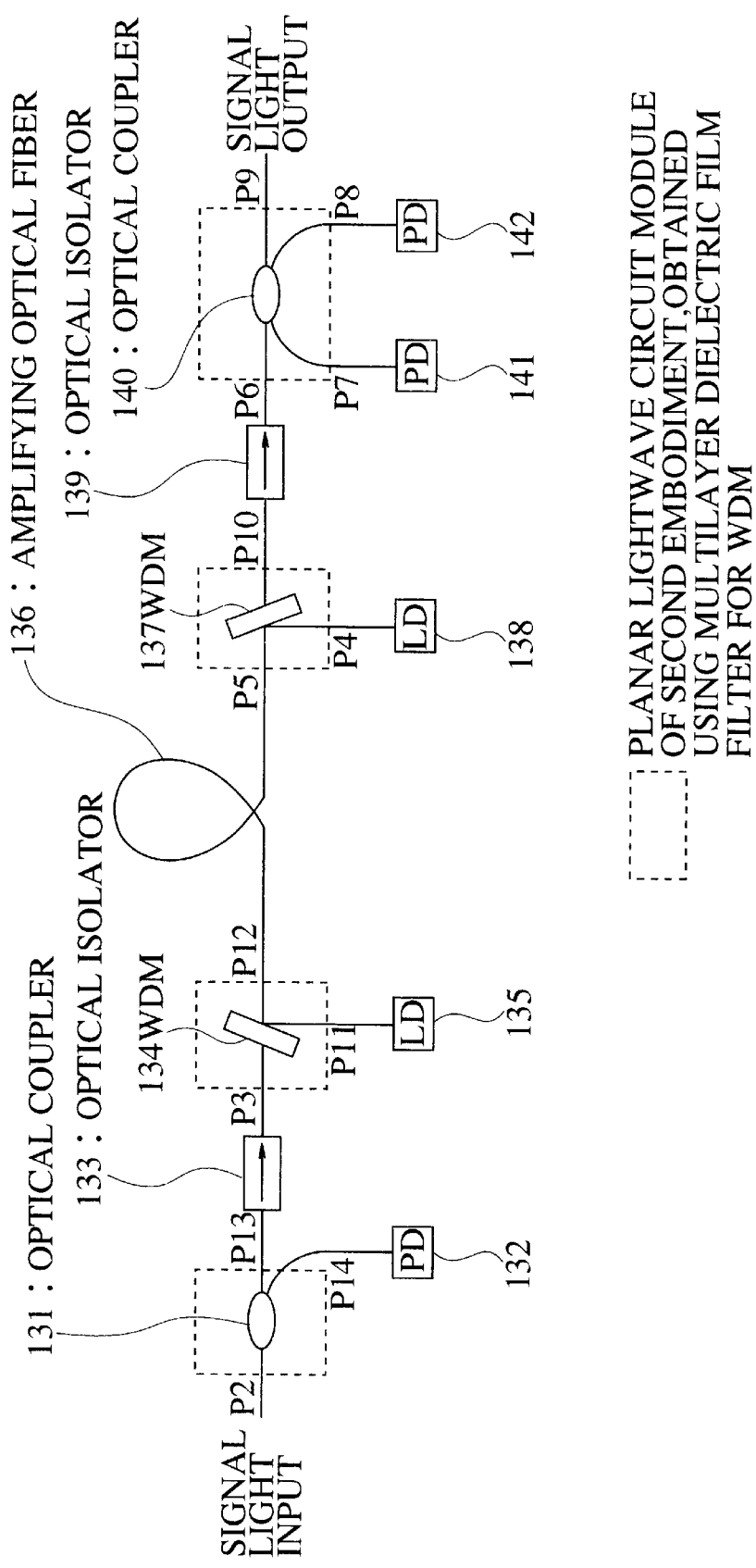
FIG. 17 is a block diagram depicting the structure of an optical fiber amplifying device obtained using a WDM based on a multilayer dielectric film in accordance with the second embodiment.
Figure 18:
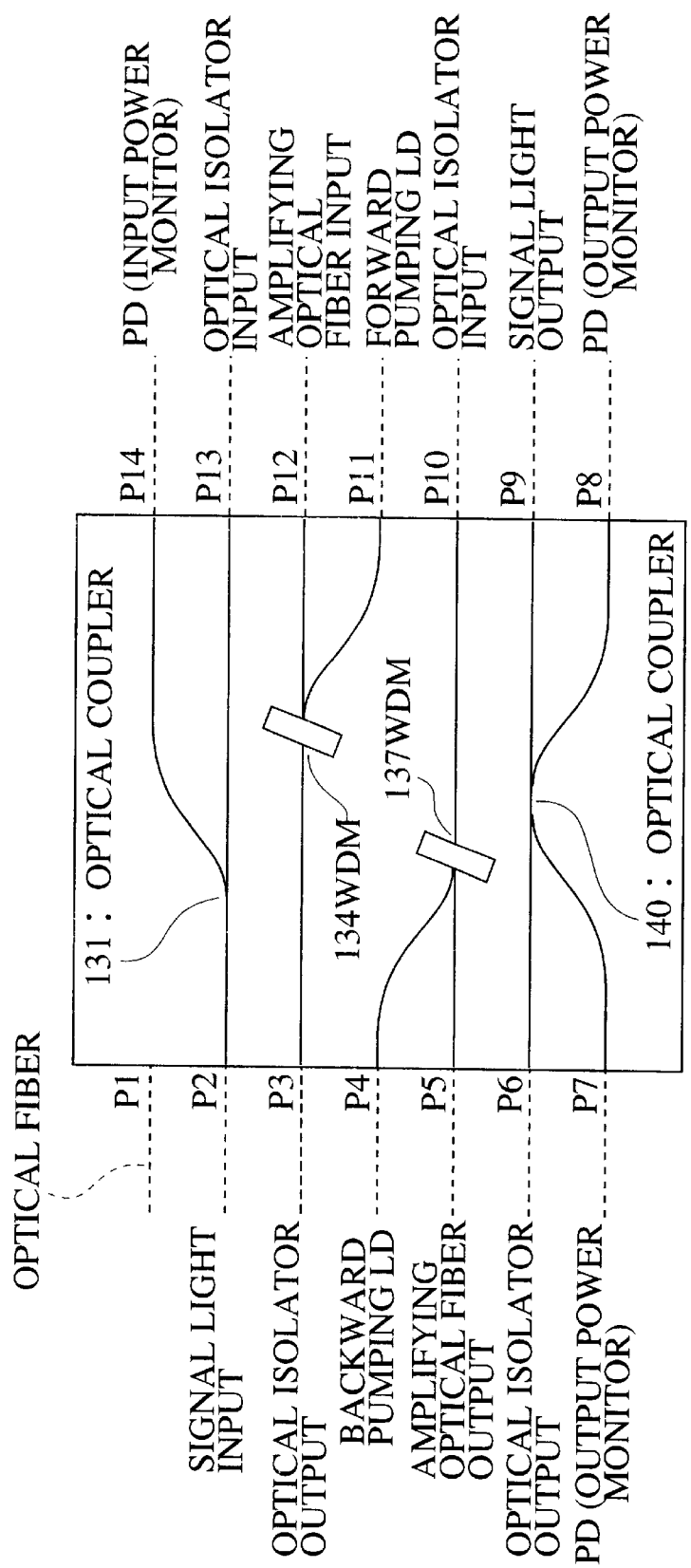
FIG. 18 is a diagram depicting a detailed structure of an optical waveguide device obtained using a WDM based on a multilayer dielectric film in accordance with the second embodiment.
Figure 19:
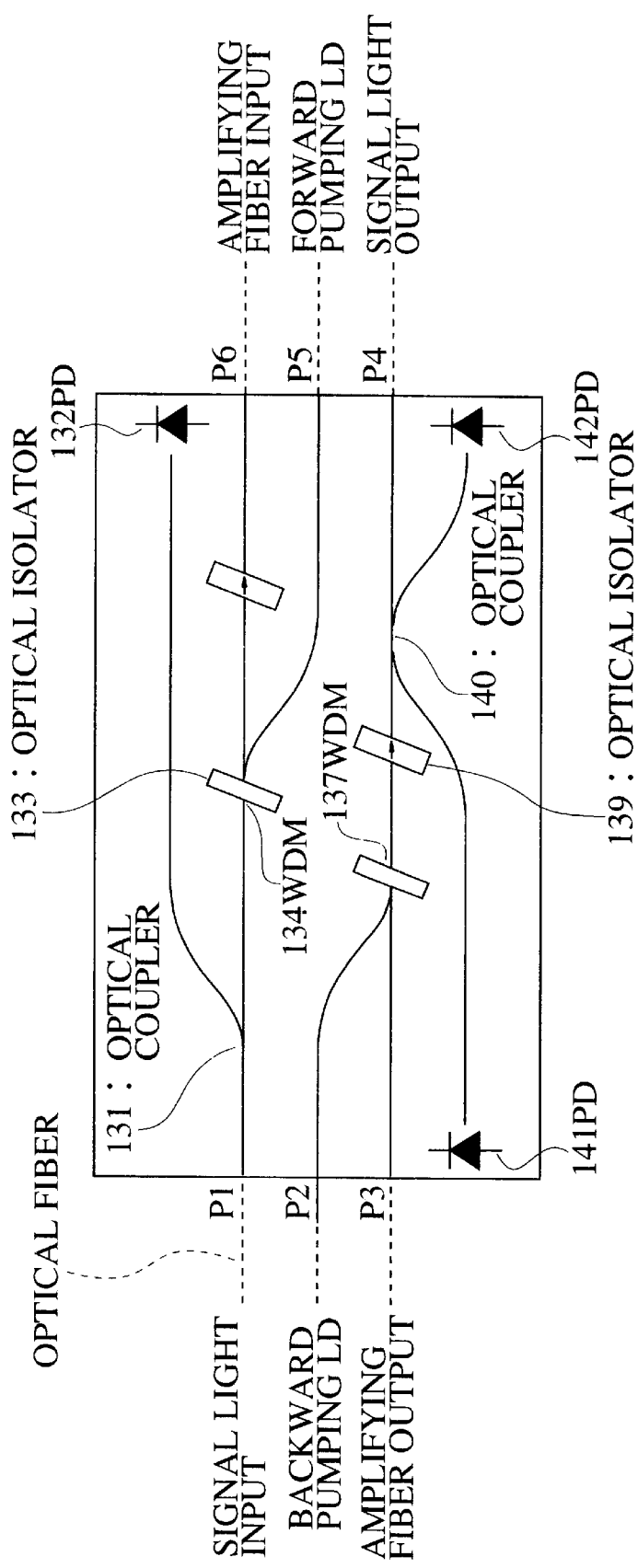
FIG. 19 is a diagram depicting a detailed structure of an optical waveguide device obtained using a WDM based on a multilayer dielectric film in accordance with the third embodiment.
Figure 20:
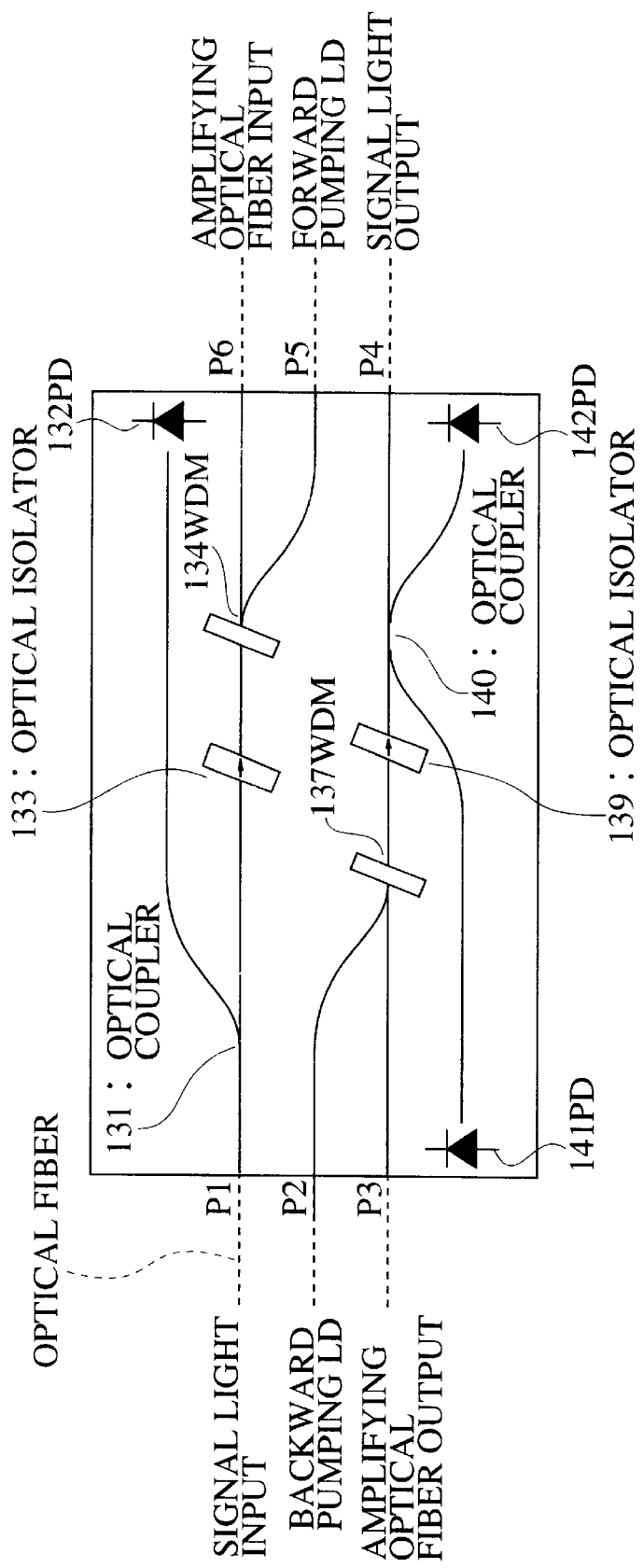
FIG. 20 is a diagram depicting a detailed structure of an optical waveguide device obtained using a WDM based on a multilayer dielectric film in accordance with the fourth embodiment.
Figure 21:
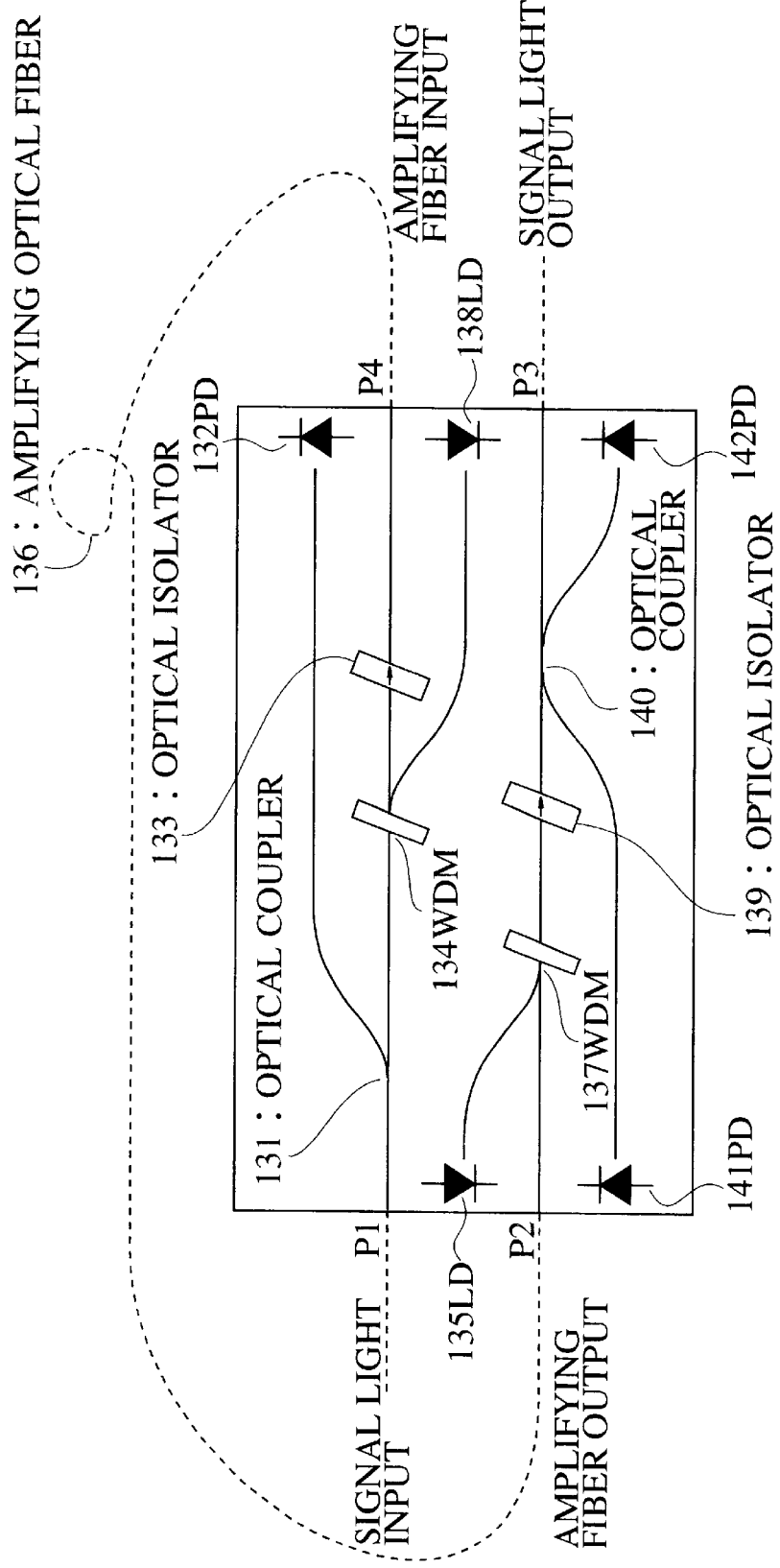
FIG. 21 is a diagram depicting a detailed structure of an optical waveguide device obtained using a WDM based on a multilayer dielectric film in accordance with the fifth embodiment.

FIG. 15 is a block diagram depicting the structure of the optical fiber amplifying device according to the seventh embodiment. In addition, FIG. 16 is a diagram depicting a detailed structure of the planar lightwave circuit module according to the seventh embodiment. In FIGS. 15 and 16, the same symbols are used to designate structural components that correspond to the structure of the first embodiment shown in FIGS. 3 and 4.

Whereas the WDM used in the first embodiment is a directional coupling device constructed using waveguides, an optical filter based on a multilayer dielectric film is used in the seventh embodiment.

In the optical fiber amplifying device of the seventh embodiment, a device obtained using an optical filter based on a multilayer dielectric film is used instead of the above-described WDM of the first embodiment. A directional coupling device is used as the WDM in the first embodiment. The basic structure and operation are the same as in the first embodiment, however. Because it cannot be configured as a waveguide, the multilayer dielectric film is integrated into the substrate, thereby yielding a planar lightwave circuit module.

There is, therefore, no need to describe the structure or operation of the planar lightwave circuit module of the seventh embodiment, or the structure or operation of an optical fiber amplifying device obtained using the planar lightwave circuit module of the seventh embodiment.

Thus, the seventh embodiment has the same merits as the first embodiment.

In addition, a WDM based on a multilayer dielectric film is used in accordance with the seventh embodiment, providing benefits such as reduced crosstalk light (increased crosstalk) than in the case of the first embodiment (in which a directional coupling WDM is used), as well as wider signal light wavelength band and pumping light wavelength band.

(H) Other Embodiments

The WDM of the first embodiment is described in relation to the seventh embodiment as a modification in which a device based on directional coupling is changed to a device based on a multilayer dielectric film. Similarly, modifications in which devices based on directional coupling are changed to devices based on multilayer dielectric films may be adopted for the second to sixth embodiments. The structures (excluding the above-described WDM) of the resulting embodiments operate in the same way and have the same merits as the corresponding unmodified embodiments. These structures also have all the benefits of the WDM described in the merits of the seventh embodiment section above. No description is therefore given for these embodiments, but their block diagrams are shown in FIGS. 17–22 (to find the corresponding drawing, see the legends appended thereto).

As described with reference to the above embodiments, the present invention may apparently be applied to optical fiber communications. The present invention may also be used in the same manner in other systems requiring signal light amplification.

Although fibers doped with rare-earth metals were applied as the amplifying optical fibers used in the above-described embodiments, any other type of fiber may also be used as long as it has the same amplification action.

Although devices constructed using directional coupling or multilayer dielectric film were applied as the WDM used in the above-described embodiments, any other type of device may also be used as long as it has the same action.

Figure 22:
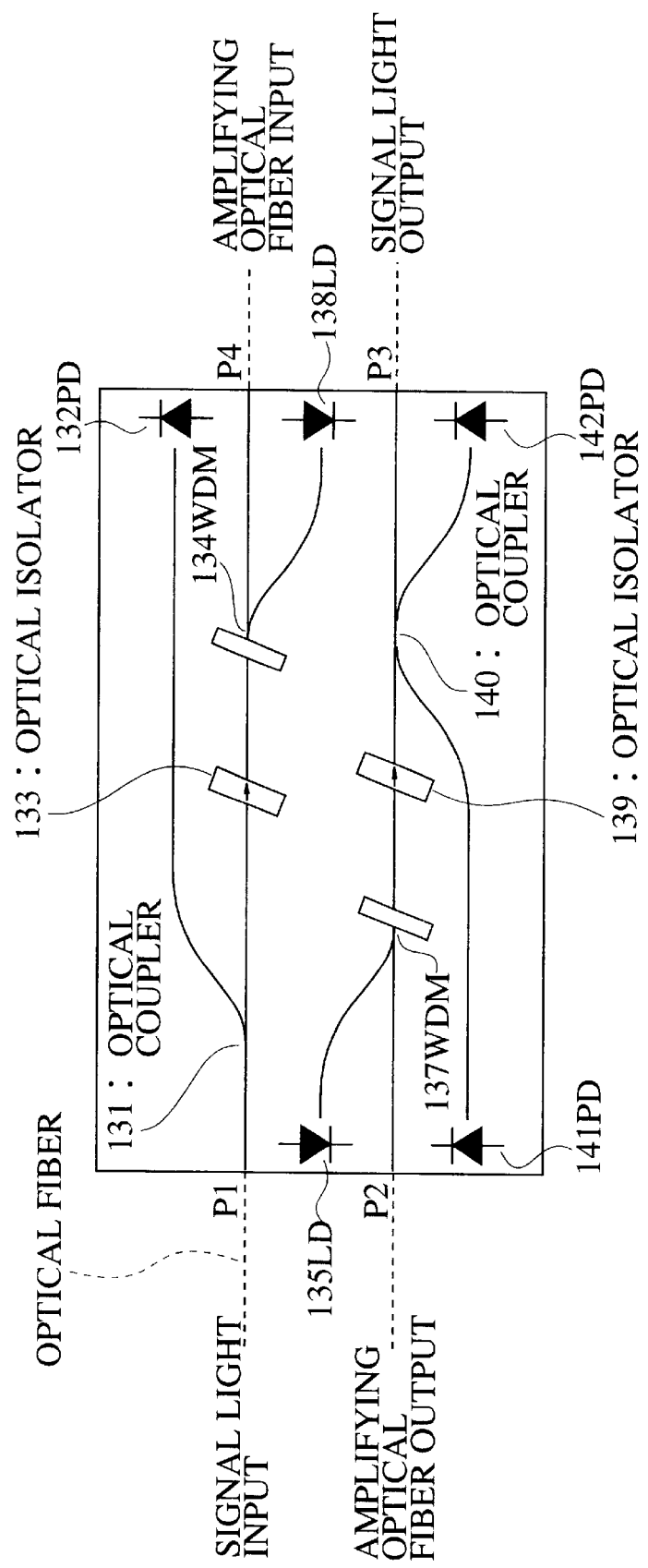
FIG. 22 is a diagram depicting a detailed structure of an optical waveguide device obtained using a WDM based on a multilayer dielectric film in accordance with the sixth embodiment.
Figure 23:
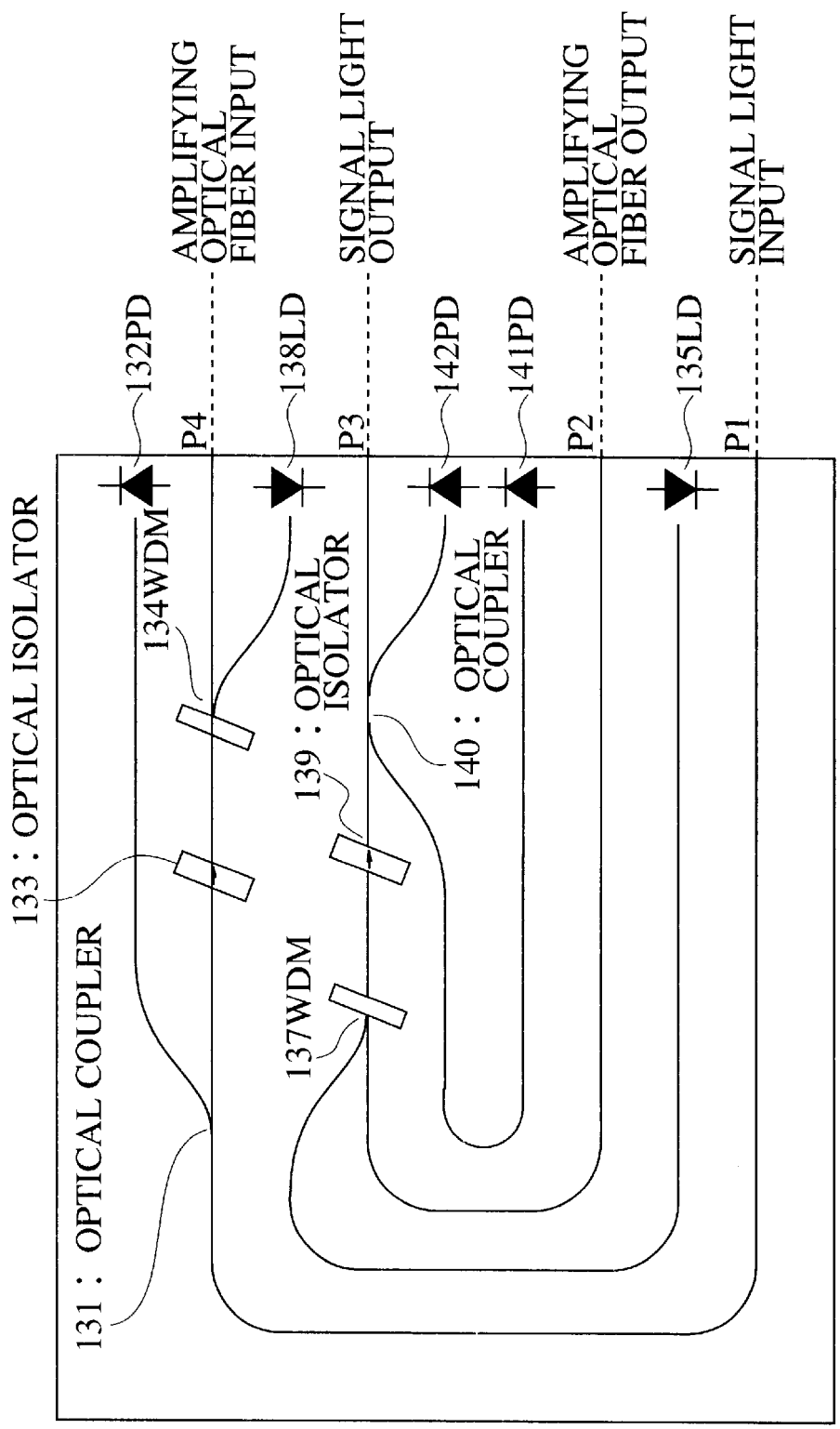
FIG. 23 is a diagram depicting a case in which all the input ports on the right side of the optical waveguide device shown in FIG. 22 are constructed on the left side.

Although the embodiment described above pertain to structures in which input ports are located on the left side of a planar lightwave circuit module, and output ports are located on the right side, it is also possible for some or all of the input ports or output ports to be located on the same side. For example, FIG. 23 depicts a structure in which all the input ports on the left side of the planar lightwave circuit module in FIG. 22 are located on the right side. Using the planar lightwave circuit module depicted in FIG. 23 allows connections to be made by multiple fusion splicing at a single location, and contributes to a further reduction in the number of assembly steps.

Thus, the above-described optical fiber amplifying device of the present invention can contribute to a reduction in the number of components, in the dimensions of the product, and in the number of assembly steps because a waveguide device for optical fiber amplifying devices can be obtained by forming the following components into a unitary structure: a group of light input ports having one or more light input ports; a group of light output ports having one or more light output ports; a waveguide network in which light provided to one or more of the aforementioned light input ports is coupled to one or more of the aforementioned light output ports; and one or more optical components mounted as the structural elements of the optical fiber amplifying device at prescribed locations in the waveguide network. Another merit is that because the device is composed of waveguides, there is no need to fix the structural elements in place at precise locations, and a contribution can be made to achieving a smaller number of assembly steps. Yet another merit is that because the input and output units are fixed in place, multiple fusion splicing can be employed, and a contribution can be made to achieving a smaller number of assembly steps.

Another merit of the optical fiber amplifying device according to the present invention is that the optical amplification characteristics thereof are prevented from being adversely affected (from undergoing concentration extinction) because the amplifying optical fibers are not configured as waveguides.

What is claimed is:

1. An optical fiber amplifying device, comprising:
    a planar lightwave circuit module;
    an amplifying optical fiber;
    signal light input ports provided to said planar lightwave circuit module;
    a first connection port provided to said planar lightwave circuit module and connected to said signal light input ports and to one end of said amplifying optical fiber;
    a second connection port provided to said planar lightwave circuit module and connected to the other end of said amplifying optical fiber;
    signal light output ports provided to said planar lightwave circuit module and connected to said second connection port;
    a pumping source for said amplifying optical fiber; and
    optical coupling means provided to said planar lightwave circuit module and designed for feeding pumping light from said pumping source to said amplifying optical fiber.

2. The optical fiber amplifying device according to claim 1, wherein said planar lightwave circuit module further comprises a third connection port connected to said pumping source, and a fourth connection port connected to a monitoring element for monitoring the operating state of said amplifying optical fiber.

3. The optical fiber amplifying device according to claim 1, wherein said pumping source is incorporated into said planar lightwave circuit module.

4. The optical fiber amplifying device according to claim 1, wherein a monitoring element for monitoring the operating state of said amplifying optical fiber is incorporated into said planar lightwave circuit module.

5. The optical fiber amplifying device according to claim 1, wherein said signal light input ports, said signal light output ports, and said first and second connection ports are spaced at regular intervals, and the optical fibers connected to these ports are spliced by multiple fusion.

6. The optical fiber amplifying device according to claim 2, wherein said signal light input ports, said signal light output ports, and said first, second, third, and fourth connection ports are spaced at regular intervals, and the optical fibers connected to these ports are spliced by multiple fusion.

7. The optical fiber amplifying device according to claim 1, wherein part of a light propagation path for connecting said signal light input ports and said first connection port has an optical waveguide provided to said planar lightwave circuit module.

8. The optical fiber amplifying device according to claim 1, wherein part of a light propagation path for connecting said signal light input ports and said first connection port has an optical waveguide provided to said planar lightwave circuit module; and
    part of said optical waveguide comprises the optical waveguide structure of an optical coupler and the optical waveguide structure of a WDM constituting said optical coupling means.

9. The optical fiber amplifying device according to claim 8, further comprising an optical isolator that constitutes said optical coupling means between said first connection port and said WDM.

10. The optical fiber amplifying device according to claim 9, wherein said isolator is incorporated into an optical waveguide provided to said planar lightwave circuit module.

11. The optical fiber amplifying device according to claim 1, wherein part of a light propagation path for connecting said signal light output ports and said second connection port has an optical waveguide provided to said planar lightwave circuit module.

12. The optical fiber amplifying device according to claim 1, wherein part of a light propagation path for connecting said signal light output ports and said second connection port has an optical waveguide provided to said planar lightwave circuit module; and
    part of said optical waveguide comprises the optical waveguide structure of an optical coupler and the optical waveguide structure of a WDM constituting said optical coupling means.

13. The optical fiber amplifying device according to claim 12, wherein an optical isolator is connected between said optical coupler and said WDM.

14. The optical fiber amplifying device according to claim 13, wherein said isolator is incorporated into an optical waveguide provided to said planar lightwave circuit module.

15. The optical fiber amplifying device according to claim 8, wherein an optical isolator is connected between said optical coupler and said WDM.

16. The optical fiber amplifying device according to claim 15, wherein said isolator is incorporated into an optical waveguide provided to said planar lightwave circuit module.

17. The optical fiber amplifying device according to claim 8, wherein said pumping source is incorporated into said planar lightwave circuit module and is connected to said WDM.

18. The optical fiber amplifying device according to claim 12, wherein said pumping source is incorporated into said planar lightwave circuit module and is connected to said WDM.

19. The optical fiber amplifying device according to claim 8, wherein a monitoring element for monitoring the operating state of said amplifying optical fiber is incorporated into said planar lightwave circuit module and is connected to said optical coupler.

20. The optical fiber amplifying device according to claim 12, wherein a monitoring element for monitoring the operating state of said amplifying optical fiber is incorporated into said planar lightwave circuit module and is connected to said optical coupler.

21. The optical fiber amplifying device according to claim 8, wherein said WDM is a directional coupler.

22. The optical fiber amplifying device according to claim 12, wherein said WDM is a directional coupler.

23. The optical fiber amplifying device according to claim 8, wherein part of the light propagation path for connecting said signal light input ports and said first connection port has an optical waveguide provided to said planar lightwave circuit module;
    part of said optical waveguide is provided with an optical waveguide structure for an optical coupler;
    said optical coupling means is provided with a WDM incorporated into said optical waveguide; and
    said WDM is an optical filter composed of a multilayer dielectric film.

24. The optical fiber amplifying device according to claim 12, wherein part of the light propagation path for connecting said signal light output ports and said second connection port has an optical waveguide provided to said planar lightwave circuit module;
    part of said optical waveguide is provided with an optical waveguide structure for an optical coupler;

said optical coupling means is provided with a WDM incorporated into said optical waveguide; and said WDM is an optical filter composed of a multilayer dielectric film.

25. A planar lightwave circuit module used in conjunction with a pumping source for an amplifying optical fiber, comprising:

signal light input ports;

signal light output ports;

a first connection port connected to said signal light input ports and to one end of an amplifying optical fiber;

a second connection port connected to said signal light input ports and to the other end of said amplifying optical fiber; and optical coupling means for feeding pumping light to said amplifying optical fiber from said pumping source.

26. The planar lightwave circuit module according to claim 25, further comprising a third connection port connected to said pumping source, and a fourth connection port connected to a monitoring element for monitoring the operating state of said amplifying optical fiber.

27. The planar lightwave circuit module according to claim 25, wherein said pumping source is incorporated into said planar lightwave circuit module.

28. The planar lightwave circuit module according to claim 25, wherein a monitoring element for monitoring the operating state of said amplifying optical fiber is incorporated into said planar lightwave circuit module.

29. The planar lightwave circuit module according to claim 25, wherein said signal light input ports, said signal light output ports, and said first and second connection ports are spaced at regular intervals.

30. The planar lightwave circuit module according to claim 26, wherein said signal light input ports, said signal light output ports, and said first, second, third, and fourth connection ports are spaced at regular intervals.

31. The planar lightwave circuit module according to claim 25, further comprising an optical waveguide that constitutes part of a light propagation path for connecting said signal light input ports and first connection port.

32. The planar lightwave circuit module according to claim 25, wherein an optical waveguide is provided for forming part of a light propagation path for connecting said signal light input ports and said first connection port; and part of said optical waveguide is provided with the optical waveguide structure of an optical coupler and with the optical waveguide structure of a WDM constituting said optical coupling means.

33. The planar lightwave circuit module according to claim 32, further comprising an optical isolator that constitutes said optical coupling means between said first connection port and said WDM, said isolator being incorporated into said optical waveguide.

34. The planar lightwave circuit module according to claim 25, further comprising an optical waveguide that constitutes part of a light propagation path for connecting said signal light output ports and said second connection port.

35. The planar lightwave circuit module according to claim 25, wherein an optical waveguide is provided for forming part of a light propagation path for connecting said signal light output ports and said second connection port; and part of said optical waveguide is provided with the optical waveguide structure of an optical coupler and with the optical waveguide structure of a WDM constituting said optical coupling means.

36. The planar lightwave circuit module according to claim 35, further comprising an optical isolator connected between said optical coupler and said WDM, said isolator being incorporated into said optical waveguide.

37. The planar lightwave circuit module according to claim 32, further comprising an optical isolator connected between said optical coupler and said WDM, said isolator being incorporated into said optical waveguide.

38. The planar lightwave circuit module according to claim 32, wherein said pumping source is incorporated into said planar lightwave circuit module and is connected to said WDM.

39. The planar lightwave circuit module according to claim 35, wherein said pumping source is incorporated into said planar lightwave circuit module and is connected to said WDM.

40. The planar lightwave circuit module according to claim 32, wherein a monitoring element for monitoring the operating state of said amplifying optical fiber is incorporated into said planar lightwave circuit module and is connected to said optical coupler.

41. The planar lightwave circuit module according to claim 35, wherein a monitoring element for monitoring the operating state of said amplifying optical fiber is incorporated into said planar lightwave circuit module and is connected to said optical coupler.

42. The planar lightwave circuit module according to claim 32, wherein said WDM is a directional coupler.

43. The planar lightwave circuit module according to claim 35, wherein said WDM is a directional coupler.

44. The planar lightwave circuit module according to claim 32, wherein an optical waveguide is provided for forming part of the light propagation path for connecting said signal light input ports and said first connection port;

part of said optical waveguide is provided with an optical waveguide structure for an optical coupler;

said optical coupling means is provided with a WDM incorporated into said optical waveguide; and said WDM is an optical filter composed of a multilayer dielectric film.

45. The planar lightwave circuit module according to claim 35, wherein an optical waveguide is provided for forming part of the light propagation path for connecting said signal light output ports and said second connection port;

part of said optical waveguide is provided with an optical waveguide structure for an optical coupler;

said optical coupling means is provided with a WDM incorporated into said optical waveguide; and said WDM is an optical filter composed of a multilayer dielectric film.

46. The planar lightwave circuit module according to claim 25, further comprising dummy ports for establishing regular intervals between the ports.

47. The planar lightwave circuit module according to claim 26, further comprising dummy ports for establishing regular intervals between the ports.

* * * * *